United States Patent
Dehmubed et al.

(10) Patent No.: US 10,332,373 B1
(45) Date of Patent: Jun. 25, 2019

(54) PACKAGING SUPPORTING VERIFICATION OF PACKAGE INTEGRITY AND DETECTION OF RELATED INTRUSION

(71) Applicants: Rohinton S. Dehmubed, San Francisco, CA (US); Peter Gompper, San Francisco, CA (US)

(72) Inventors: Rohinton S. Dehmubed, San Francisco, CA (US); Peter Gompper, San Francisco, CA (US)

(73) Assignee: eTEP Inc., San Francisco, CA (US)

( * ) Notice: Subject to any disclaimer, the term of this patent is extended or adjusted under 35 U.S.C. 154(b) by 0 days.

(21) Appl. No.: 16/180,512

(22) Filed: Nov. 5, 2018

(51) Int. Cl.
*G06Q 30/00* (2012.01)
*G08B 13/24* (2006.01)

(52) U.S. Cl.
CPC ..... *G08B 13/2442* (2013.01); *G06Q 30/0185* (2013.01); *G08B 13/2417* (2013.01); *G08B 13/2431* (2013.01)

(58) Field of Classification Search
None
See application file for complete search history.

(56) References Cited

U.S. PATENT DOCUMENTS

| | | | |
|---|---|---|---|
| 5,294,470 | A | 3/1994 | Ewan |
| 6,063,503 | A | 5/2000 | Hatakeyama et al. |
| 6,287,965 | B1 | 9/2001 | Kang et al. |
| 6,391,407 | B1 | 5/2002 | Kashiba et al. |
| 7,170,409 | B2 | 1/2007 | Ehrensvard et al. |
| 2004/0066296 | A1* | 4/2004 | Atherton ............ G08B 13/1445 340/572.1 |
| 2008/0223936 | A1* | 9/2008 | Mickle ................. B65D 75/327 235/492 |
| 2009/0184824 | A1* | 7/2009 | Forster ............. G06K 19/07327 340/572.1 |
| 2011/0236703 | A1 | 9/2011 | McGee |

(Continued)

OTHER PUBLICATIONS

Circus Tamper Loop: A New Digital Seal for Your Products; Smartrac N.V. Oct. 2018.

(Continued)

*Primary Examiner* — Thomas S McCormack
(74) *Attorney, Agent, or Firm* — Gordon & Jacobson, P.C.

(57) ABSTRACT

A packaging system is provided includes a sensing barrier protecting at least one article. The sensing barrier is formed from a multilayer laminate structure that encapsulates a transformative material between first and second conductive layers. The transformative material is configured to undergo a state change (for example, by a chemical reaction or physical reaction) that changes impedance between the first and second conductive layers in response to intrusion through the multilayer laminate structure. An NFC/RFID circuit is electrically coupled to the first and second conductive layers of the multilayer laminate structure. At least one operational characteristic of the NFC/RFID circuit is dependent on the change in impedance between the first and second conductive layers of the multilayer laminate structure in response to intrusion. The operational characteristic(s) of the NFC/RFID circuit can be ascertained and analyzed (for example, by suitable operations of an external NFC/RFID interrogator) to detect the intrusion and provide an indication of the intrusion if and when detected.

30 Claims, 25 Drawing Sheets

(56) References Cited

U.S. PATENT DOCUMENTS

| | | |
|---|---|---|
| 2011/0239450 A1 | 10/2011 | Basol et al. |
| 2013/0008332 A1 | 1/2013 | Nair et al. |
| 2013/0068842 A1* | 3/2013 | Kuo .................. G06K 19/0739 |
| | | 235/488 |
| 2013/0135104 A1 | 5/2013 | Nikkanen |
| 2016/0192188 A1 | 6/2016 | Coulier |

OTHER PUBLICATIONS

Flexure-based Roll-to-roll Platform: A Practical Solution for Realizing Large-area Microcontact Printing, Xi Zhou et al., Scientific Reports, 5:10402; Jun. 3, 2015.

* cited by examiner

PACKAGING SUPPORTING VERIFICATION OF PACKAGE INTEGRITY AND DETECTION OF RELATED INTRUSION

BACKGROUND

1. Field

The present disclosure relates to packaging solutions that can verify and validate package integrity and detect multiple forms of product falsification, including intrusion of package integrity (for example, due to tampering or siphoning). The present disclosure also relates to packaging solutions that can provide information regarding package integrity and falsification for track-and-trace services throughout a supply chain.

2. State of the Art

The trade in counterfeit, imitation and falsified products is estimated at five percent to seven percent of overall world trade, which is greater than $600 billion per annum. Counterfeit and falsified products (including intrusion and tamper events, such as an unauthorized opening or modification to one or more packaged items) are major concerns when sourcing supplies, and manufacturing, handling, storing, shipping and selling products such as medication and other valuable or sensitive items. Counterfeit, imitation and falsified Products are major problems in several industries including drinks, foods, refined chemicals, nuclear power, and across brand-name, lifestyle/personal, and luxury goods. The theft of intellectual property and financial damage to producers and employees (in lost product revenue or personal income) and governments (in lost tax revenue) is only one aspect of the problem. There are also significant and real health risks due to counterfeit medication and the use of harmful chemicals.

For instance, legitimate medicines are produced under highly controlled and regulated conditions using good manufacturing practices (GMP) and good distribution practices (GDP). International quality standards ensure patients consume only safe and effective products which are registered or licensed. Falsified products in the medical field are fake (e.g., unregistered or unlicensed medical products), passed-off as legitimate authorized medicines or medical devices, and are typically ineffective, adulterated products or toxic. The magnitude of falsified products in the medical field is significant, with approximately ten percent of pharmaceuticals in the global chain being falsified, and frequency of sale in developing countries particularly high, e.g., Latin America (30%), Africa (50%), and the former Soviet Union (20%). The European Union (EU), the United States (USA), and other countries have strong legal frameworks for the licensing, manufacturing and distribution of medicines. In the USA, the Drug Supply Chain Security Act (DSCSA) was enacted to provide a uniform national track-and-trace system for prescription drugs—an interoperable system in which manufacturers and re-packagers are required to include a unique product identifier (2-D barcode), lot number and expiration date to prescription-drug packaging for full product tracking across the supply chain by 2023. Importantly, the impact will be felt equally in other countries which export to the United States. In the EU, the European Commission published a regulation that requires use of two safety features placed on the packaging of most human medicines: a unique identifier (or 2-dimension barcode) and an anti-tampering device. Marketing authorization holders (or manufacturers) must place these on the packaging of most prescription medicines and certain non-prescription medicines no later than 9 Feb. 2019. The intention of such safety features is to guarantee authenticity of medicine for the benefit of patients and businesses and to strengthen the security of the medicine supply chain; from the sourcing of active and incipient products to the manufacturing and distribution at pharmacy and hospital.

Pharmaceutical executives point to special packaging as a promising instrument for the detection and removal of counterfeit products from the supply chain of medicines and medical devices, especially those sold online, as regulations address all points along the supply chain (except that of the consumer at point-of-sale) as product authenticators. However, packaging technologists are challenged by nefarious actors who 'game' and infiltrate vulnerable porous supply chains, as the routes of medical products from manufacturers to consumers can be long and circuitous. With increased transnational outsourcing of medical production, from the procurement of key and incipient ingredients to the final stages of assembly and distribution, criminals capitalize on the weaknesses or negligence of material processing. In addition, the majority of manufacturing occurs in countries with minimal consumer protection and product liability laws. Also, numerous secondary wholesalers, retailers and re-packagers constitute extra layers in distribution networks, allowing for the diversion of legitimate medicine and the entry of falsified medicines. Pharmaceutical manufacturers who have been inspected with few or no regulatory warnings by the U.S Food and Drug Administration (e.g., FDA 483s) may potentially also be involved in producing and distributing substandard medicines, possibly due to unintentional manufacturing negligence or due to inappropriate handling during transport and storage, or the manufacture of Over-run products. Inspections of a facility by the FDA is data-dependent, and includes compliance history, recall trends, time since last inspection, inherent risk of the drug being manufactured, processing complexity and other factors. Also, medicines manufactured for export from developed countries to developing countries often fail GMP standards when the product is for domestic use, or fail to provide correct packaging and labeling regarding sterility (e.g., for needle-type products) including misbranding, errors in product labeling, manufacturing defects, failures to follow GMP, or missing parts or product performance failures. In addition, "parallel production" in the same GMP-compliant facilities allows for production of high, intermediate and low standard materials for the three different markets: strictly regulated, middle-income, poorly-regulated, respectively, without awareness by the consumer. Furthermore, policing agencies (e.g., WHO, UNODC, Interpol, etc.) lack evidenced-based data upon which law enforcement and policy formulation can be used to protect public health and reduce the risks to patient safety by falsified products. For instance, a flourishing e-commerce market allows for Blur Counterfeiting of medicines and infiltration of the legitimate supply chain by falsified products which reach directly to consumers with limited awareness of the risks.

Healthcare professionals widely recognize these problems but are limited in their ability to prevent falsified medicines from being purchased by patients. Developing countries which lack the enforcement of quality pharmaceutical standards and also struggle with chronically poor storage conditions, high temperatures and high humidity, place patients at risk of degraded medicines (e.g., tetracyclines). In developed countries, where underinsured or uninsured patients purchase spurious products as «medicine»—because the price is significantly lower than that of a legitimate product—are at significant risk. Other areas of exposure from which nefarious actors profit from SSSFFCC products includes: technical barriers in drug sampling methods, the use of 'grey zones' in the production and trade of falsified medicines (which allow criminals to go undetected), a lack of reporting by healthcare workers and patients, and a reluctance by industry and governmental agencies to share critical information for fear of damage to sales and/or reputation associated with criminal activities. Altogether, the market environment holds significant difficulty for manufacturers, governments, regulators, consumers and other stakeholders seeking technologies which can ensure package and product integrity.

Packaging typically employ machine readable labels, such as bar codes, data matrix codes and NFC/RFID-tags, to encode information about one or more packaged items, which can be read a suitable interrogator (e.g., bar code reader or NFC/RFID interrogator) as needed.

Cypack AB of Stockholm, Sweden has developed technology that employs printed resistive loops or traces and an electronics module on a package to detect damage to or intrusion into the package. A tamper event that breaks one or more of the resistive loops is detected by the electronics module and stored with a timestamp. Details of this technology is described in U.S. Pat. No. 7,170,409.

SMARTRAC N.V of Amsterdam, Netherlands has developed similar technology (referred to as CIRCUS TAMPER LOOP) that employs printed resistive loops or traces and an NFC/RFID chip (NXP's NTAG 213 TT chip) on a package to detect damage to or intrusion into the package. Details of this technology is described at https://www.smartrac-group.com/circus-tamper-loop-a-new-digital-seal-for-your-products.html.

The resistive-loop tamper detection mechanisms used by these technologies operate at the primary entry point of the package and can easily be thwarted by nefarious actors. For example, a wire or other conductive material can be added that provides a bypass path for a loop or trace that is cut or otherwise broken by the intrusion or damage to the package. Such designs make it relatively easy for nefarious actors to be a few steps ahead of the tamper detection mechanisms. Other packaging technologies include bar coding (1-D and 2-D), holography, nanotechnology, taggants, and "other security options" such as software integration services.

SUMMARY

In embodiments, a packaging system includes a sensing barrier or surface that protects at least one article. The sensing barrier is formed from a multilayer laminate structure that includes an encapsulated transformative material disposed between first and second conductive layers. The transformative material is configured to undergo a state change (for example, by chemical reaction or physical change) that changes impedance between the first and second conductive layers in response to an intrusion (i.e., a physical break of the multilayer laminate structure). An NFC/RFID circuit is electrically coupled to the first and second conductive layers of the multilayer laminate structure. At least one operational characteristic of the NFC/RFID circuit is dependent on the change of impedance between the first and second conductive layers of the multilayer laminate structure as provided by the transformative material in response to the intrusion. The operational characteristic(s) of the NFC/RFID circuit can be ascertained and analyzed (for example, by suitable operations of an external NFC/RFID interrogator) to detect the intrusion and provide an indication of the intrusion if and when detected.

In embodiments, the multilayer laminate structure can have a first configuration that provides a relatively high impedance electrical current path between the first and second conductive layers under normal conditions absent intrusion. The multilayer laminate structure can also have a second configuration where a state change (for example, by a chemical reaction or physical change) of the transformative material provides part or all of a relatively low impedance electrical current path between the first and second conductive layers. The multilayer laminate structure can automatically transition from the first configuration to the second configuration in response to the intrusion.

In embodiments, the multilayer laminate structure can function under normal conditions as a flexible two-plate capacitor with the first and second conductive layers equivalent to the two plates of the capacitor, and the encapsulated transformative material equivalent to the dielectric medium between the two plates. As a two-plate capacitor, the multilayer laminate structure provides a relatively high impedance electrical current path between the first and second conductive layers of the multilayer laminate structure. In response to an intrusion, the transformative material undergoes a state change (for example, by chemical reaction or physical change) such that the material provides part or all of a relatively low impedance electrical current path between the first and second conductive layers.

In embodiments, the packaging system can further include an antenna with two antenna terminals that are electrically coupled to the NFC/RFID circuit. The antenna can be printed on a flexible substrate that also supports the NFC/RFID circuit. These components can be mounted on or otherwise supported by the multilayer laminate structure.

In embodiments, the NFC/RFID circuit can be a passive NFC/RFID circuit which does not contain a battery, but instead harvests electrical power from the RF signal supplied by an external NFC/RFID interrogator. In this case, the passive NFC/RFID circuit can be configured to cooperate with the antenna to receive and store electrical power from electromagnetic radiation emitted by an external NFC/RFID interrogator.

In embodiments, the first and second conductive layers of the multilayer laminate structure can be electrically coupled to the two antenna terminals. In such embodiments, under normal conditions absent intrusion, the multilayer laminate structure can be configured to provide a relatively high impedance electrical current path between the first and second conductive layers and the two antenna terminals electrically coupled thereto. The relatively high impedance electrical current path between the two antenna terminals allows the passive NFC/RFID circuit to harvest power from the electromagnetic radiation provided by an external NFC/RFID interrogator and use such harvested power as supply to the electrical components of the passive NFC/RFID circuit for its operations. The transformative material can also be configured to undergo a state change (for example by a chemical reaction or physical change) such that the material provides part or all of a relatively low impedance electrical current path between the first and second conductive layers and the two antenna terminals electrically coupled thereto in response to an intrusion. Such relatively low impedance electrical current path automatically configures the passive NFC/RFID circuit to remain in a power-off state in the presence of electromagnetic radiation that is normally sufficient to provide electrical power to the passive NFC/RFID circuit. In this manner, if the passive NFC/RFID circuit remains in a power-off state in the presence of electromagnetic radiation provided by an external NFC/RFID interrogator that is normally sufficient to provide electrical power to the passive NFC/RFID circuit, the external NFC/RFID interrogator can sense this power-off state, interpret this power-off state as a signal of the intrusion, and output an indication (e.g., visual or audible notification) of the intrusion if and when intrusion is detected.

In other embodiments, one of the first and second conductive layers of the multilayer laminate structure can be configured to define a detection surface. In this embodiment, the transformative material can be configured to undergo a stage change (for example, by chemical reaction or physical change) that changes impedance between the detection surface and the other conductive layer in response to an intrusion in the vicinity of the detection surface. The detection surface can be electrically coupled to a corresponding input terminal of the NFC/RFID circuit. The NFC/RFID circuit can be configured to detect a signal at the input terminal that results from the impedance change between the detection surface and the other conductive layer due to the intrusion in the vicinity of the detection surface. The NFC/RFID circuit can be further configured to derive data from such signal and communicate the data to an external NFC/RFID interrogator. The external NFC/RFID interrogator can analyze the data communicated from the NFC/RFID circuit to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the multilayer laminate structure can have a first configuration that provides a relatively high impedance electrical current path between the detection surface and the other conductive layer under normal conditions absent intrusion in vicinity of the detection surface. The multilayer laminate structure can also have a second configuration where the transformative material undergoes a state change (for example, by a chemical reaction or physical change) such that the material provides all or part of a relatively low impedance electrical current path between the detection surface and the other conductive layer in response to the intrusion in vicinity of the detection surface. A resistor can be electrically coupled between a positive voltage supply terminal of the NFC/RFID circuit and the detection surface. The other conductive layer can be electrically connected to a ground or common body terminal of the NFC/RFID circuit. The area covered by the detection surface can be configured such that the detection surface encompasses a part, nearly all or all of the area of the sensing barrier.

In embodiments, the multilayer laminate structure can function under normal conditions as a flexible two-plate capacitor with the detection surface equivalent to one plate and the other conductive layer equivalent to an opposed plate of the capacitor, and the encapsulated transformative material equivalent to the dielectric medium between the two plates. As a two-plate capacitor, the multilayer laminate structure provides a relatively high impedance electrical current path between the detection surface and the other conductive layer. In response to intrusion in the vicinity of the detection surface, the transformative material can be configured to undergo a state change (for example, by a chemical reaction or physical change) such that the material provides all or part of a relatively low impedance electrical current path between the detection surface and the other conductive layer.

In embodiments, one of the first and second conductive layers can be configured (for example, by etching or printing) to define a plurality of detection surfaces. In this configuration, the transformative material can be configured to undergo a state change (for example, by chemical reaction or physical change) that changes impedance between a respective detection surface and the other conductive layer in response to intrusion in the vicinity of the respective detection surface. The detection surfaces can be electrically coupled to corresponding input terminals of the NFC/RFID circuit. The NFC/RFID circuit can be configured to detect a signal at a respective input terminal that results from the change in impedance between the corresponding detection surface and the other conductive layer due to the intrusion. The NFC/RFID circuit can be further configured to derive data from such signal and communicate the data to an external NFC/RFID interrogator. The external NFC/RFID interrogator can analyze the data communicated from the NFC/RFID circuit to interpret the data as a signal of the intrusion (for example, by comparing the data to the expected data value(s) representing am intrusion or non-intrusion event), and output an indication (e.g., visual or audible notification) of the intrusion if and when the intrusion is detected.

In embodiments, the multilayer laminate structure can have a first configuration that provides a relatively high impedance electrical current path between each detection surface and the other conductive layer under normal conditions absent intrusion in vicinity of the detection surfaces. The multilayer laminate structure can also have a second configuration where the transformative material undergoes a state change (for example, by a chemical reaction or physical change) such that the material provides all or part of a relatively low impedance electrical current path between a respective detection surface and the other conductive layer in response to intrusion in vicinity of the respective detection surface. Resistors can be electrically coupled between a positive voltage supply terminal of the NFC/RFID circuit and corresponding detection surfaces. The other conductive layer can be electrically connected to a ground or common body terminal of the NFC/RFID circuit. The lateral spacing between the detection surfaces can be minimized and/or the area covered by the detection surfaces can be configured such that the detection surfaces encompasses a part, nearly all or all of the area of the sensing barrier.

In embodiments, the multilayer laminate structure can function under normal conditions as a parallel network of flexible two-plate capacitors with the plurality of detection surfaces equivalent to respective plates of the capacitors and the other conductive layer equivalent to an opposed common plate of the capacitors, and the encapsulated transformative material equivalent to the dielectric medium between the two plates of the capacitors. For each two-plate capacitor of the network, the multilayer laminate structure provides a relatively high impedance electrical current path between the respective detection surface and the other conductive layer. In response to intrusion in the vicinity of the respective detection surface, the transformative material can be configured to undergo a state change (for example, by chemical reaction or physical change) such that the material provides all or part of a relatively low impedance electrical current path between the respective detection surface and the other conductive layer.

In embodiments, the transformative material can undergo a state change (for example, by chemical reaction or physical change) that causes a change in impedance between the opposed conductive layers of the multilayer laminate structure. For illustration purposes, a silver nitrate gel solution can be used for the transformative material. Absent an intrusion, the multilayer laminate structure provides a relatively high impedance electrical current path between the first and second conductive layers of the multilayer laminate structure. In response to an intrusion (i.e., when an intrusion occurs), the silver nitrate gel solution can form all or part of a relatively low impedance electrical current path between the first and second conductive layers of the multilayer laminate structure. The silver nitrate gel solution by itself is conductive and it can flow to contact both of the first and second conductive layers of the multilayer laminate structure in response to the intrusion. In this manner, the flow of the silver nitrate gel solution can form all or part of a relatively low impedance current path between the first and second conductive layers. Furthermore, with the silver nitrate gel solution in contact with the appropriate metal(s) of the first and second conductive layers, the silver nitrate gel solution can undergo a galvanic displacement reaction that precipitates solid-phase silver in response to the intrusion. The solid-phase silver precipitate in conjunction with the conductive silver nitrate gel solution can also form all or part of a relatively low impedance electrical current path between the first and second conductive layers. Moreover, the precipitation of the solid-phase silver can continue such that the solid-phase silver precipitate extends between first and second conductive layers and the solid-phase silver precipitate alone (without any conductive silver nitrate gel solution) forms all or part of a relatively low impedance electrical current path between the first and second conductive layers.

In embodiments, the first conductive layer can include a conductive surface such as a layer of noble metal (e.g., of copper, magnesium, zinc, tin or other material) that undergoes a galvanic displacement reaction with metal ions of a solution (e.g., silver ions of a silver nitrate gel solution) to precipitate solid-phase metal from the solution. A first intermediate layer can be disposed between the metal ion solution and the first metal layer and aid in encapsulating the metal ion solution. The first intermediate layer can be formed from an electrically-insulating material such as polyethylene terephthalate (PETG), photo-resistant polymer, Mylar, a spun polymer with a metallic oxide coating, or other encapsulating or insulating material. Alternatively, the first intermediate layer can be formed from a thin film of conductive material, such as a conductive polymer. The first intermediate layer does not undergo a galvanic displacement reaction with the metal ion solution. In this configuration, the metal(s) of the first metal layer would undergo the galvanic displacement reaction with metal ions of the solution if in contact with the metal ion solution, but it is inhibited from doing so by the intervening first intermediate layer.

An intrusion can form an opening that extends completely through the first and second conductive layers of the multiplayer laminate structure. In response to such intrusion, the metal ion solution can be displaced (or flow) through this opening and can contact both the first and second conductive layers. In this manner, the initial displacement of the metal ion gel solution can form all or part of a relatively low impedance electrical current path between the first and second conductive layers. Furthermore, with the metal ion solution in contact with the appropriate noble metal(s) of the first and second conductive layers, the metal ion solution can undergo a galvanic displacement reaction that precipitates solid-phase metal (e.g., solid silver precipitate for a silver nitride gel solution) in response to the intrusion. The solid-phase metal precipitate in conjunction with the conductive metal ion solution can also form all or part of a relatively low impedance electrical current path between the first and second conductive layers. Moreover, the precipitation of the solid-phase metal can continue such that the solid-phase metal precipitate extends between the first and second conductive layers and the solid-phase metal precipitate alone (without any conductive metal ion solution) forms all or part of a relatively low impedance electrical current path between the first and second conductive layers.

In embodiments, the second conductive layer can include a metal layer formed from one or more noble metals (such as gold or platinum) that does not undergo a galvanic displacement reaction with metal ions of the metal ion solution to precipitate solid-phase metal from the metal ion solution. In this configuration, this metal layer can aid in encapsulating the metal ion solution.

In other embodiments, the second conductive layer can include a metal layer formed from one or more noble metals (such as copper, magnesium, zinc, tin or other material) that does undergo a galvanic displacement reaction with metal ions of the metal ion solution to precipitate solid-phase metal from the metal ion solution. In this embodiment, a second intermediate layer can be disposed between the second conductive layer and the metal ion solution. The second intermediate layer can be formed from a thin film of conductive material (such as a conductive polymer layer). The conductive material can be selected such that it does not undergo a galvanic displacement reaction with the metal ion solution that precipitates solid-phase metal yet provides for a low impedance electrical current path through the conductive material to the second conductive layer. In this configuration, the at least one noble metal of the second conductive layer would undergo the galvanic displacement reaction with metal ions of the metal ion solution if in contact with the metal ion solution, but it is inhibited from doing so by the intervening second intermediate layer.

In embodiments, the multilayer laminate structure can include an encapsulated reagent disposed between the first and second conductive layers. The reagent can be configured to react with the transformative material in response to an intrusion event and aids in the transformation of the transformative material. For illustrative purposes, in the case where the transformation material is a silver nitride gel solution, the reagent can be a solution of sodium borohydride and/or glucose that assists or enhances the galvanic displacement reaction of silver nitride solution that precipitates solid-phase silver. The reagent can possibly include other components such as catalysts, stabilizers, surfactants or initiators, in any combination thereof.

In embodiments, the multilayer laminate structure can include microcapsules of reagent that are dispersed in a matrix of the transformative material.

In other embodiments, the multilayer laminate structure can include microcapsules of the transformative material that are dispersed in a matrix of the reagent.

In yet another embodiment, the multilayer laminate structure can include microcapsules of transformative material and microcapsules of reagent that are both dispersed in an inert matrix.

In embodiments, the multilayer laminate structure can be secured with a sealant about an opening into a rigid closed-wall container (such as glass bottle) that houses the at least one article. In this configuration, the multilayer laminate structure provides a sealed protective sensing barrier that can detect intrusion through the protective sensing barrier into the interior space of the container.

In other embodiments, the multilayer laminate structure can define a space that houses the at least one article. For example, the multilayer laminate structure can be configured in a folded arrangement to define a sealed envelope or pouch or box that defines a space that houses the at least one article. In this configuration, the multilayer laminate structure provides a protective sensing barrier that can detect intrusion through the protective sensing barrier into the internal space of the envelope or pouch or box.

In another aspect, a method is provided to verify and validate package integrity. The method employs a packaging system as described and claimed where at least one operational characteristic of the NFC/RFID circuit is dependent on change in impedance between the first and second conductive layers of the multilayer laminate structure in response to intrusion. The method includes employing an NFC/RFID interrogator to ascertain the operational characteristic of the NFC/RFID circuit to detect intrusion and output an indication (e.g., visual or audible notification) of the intrusion if and when the intrusion is detected. The NFC/RFID circuit and NFC/RFID interrogator can cooperate to read other information that is related to the packaged article(s) and stored by the NFC/RFID circuit, such as ingredient information (e.g., source and date of extraction), manufacturing information (such as Plant Number and Lot number), quality control information, product identifier(s), shipping information, and other arbitrary information.

The packaging system and associated method can be used to verify and validate package integrity and detect intrusion of package integrity for a wide range of articles, including but not limited to the following:

medicine (e.g., insulin, vaccines, delicate medicines)
    food (e.g., Kosher, Vegan, Halal, non-GMO, wine provenance)
    chemicals and radioactive reagents (process integrity)
    forensics samples (e.g., collected from the scene of a crime)
    electronics (e.g., specialized microchips)
    electro-mechanical products (e.g., airplane parts)
    branded products (e.g., Gucci, Chanel, Wine, Spirits)
    lifestyle personal products (e.g., condoms, sex toys)
    documents (e.g., confidential and private documents)
    combinations of these products or other products thereof The packaging system and method can be used to verify and validate package integrity and detect intrusion for such a package and read other information that is related to the packaged article(s) and stored by the NFC/RFID circuit over time (e.g., as the article is exchanged along a supply chain). The supply chain can include ingredient information (e.g., source and date of extraction), manufacturing information (such as Plant Number and Lot number), quality control information, product identifier(s), warehousing, shipping/distribution information (for an origin to destination with intermediate locations there between), information related to point of sale including online shopping, retail stores, shops, terminals, and other arbitrary points along the supply chain.

DETAILED DESCRIPTION OF THE PREFERRED EMBODIMENTS

Figure 1A:
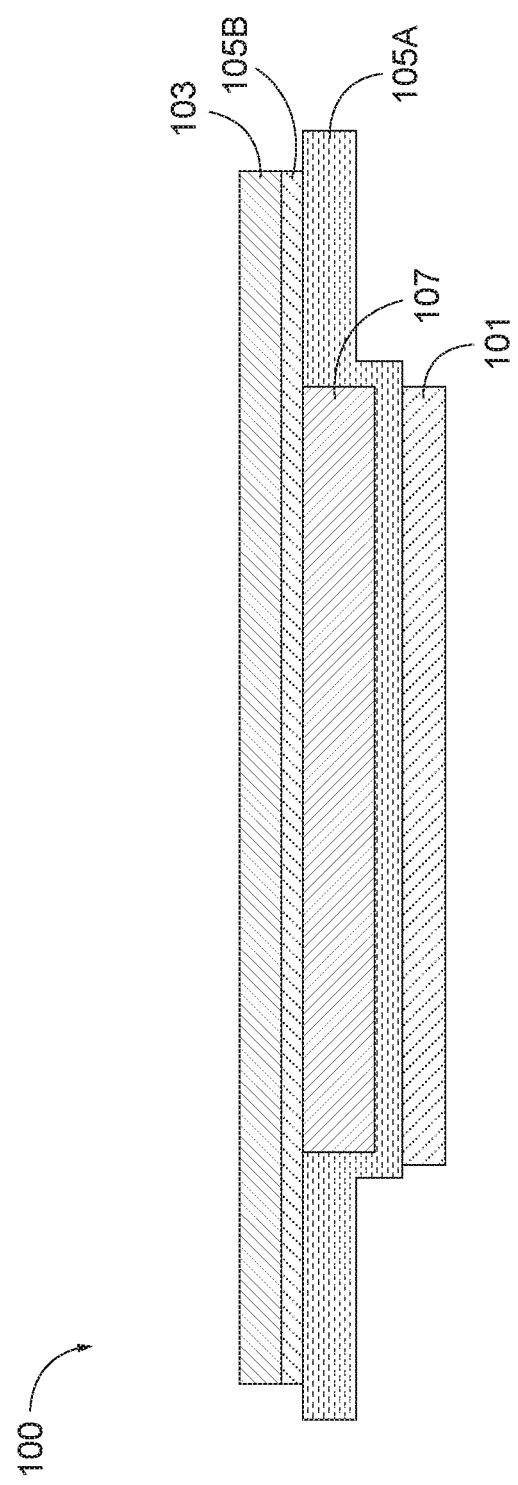
FIG. 1A is a schematic cross-sectional view of an exemplary multilayer laminate structure that can be used in packaging systems according to the present disclosure.

The following definitions apply to the present disclosure.

The term "adulterated product" is a finished product where one or more components of the finished product are fraudulent.

The term "blur counterfeiting" involves counterfeiting of products for which consumers are unsure of the status of the products as being authorized for sale (e.g., genuine) or not authorized for sale (e.g., stolen, imported or sold illegally).

The term "counterfeit product" is a fraudulent product that replicates key aspects of a genuine product. Stolen products are Counterfeit products.

The term "counterfeit drug" is a chemical entity intended for consumption that is deliberately and fraudulently mislabeled with respect to identity and/or source. One special class of substandard drugs is the class of counterfeit drugs.

The term "counterfeit goods" are illegally made products that resemble genuine goods but are typically of lower quality in terms of performance, reliability, or durability. These may also be direct copies of products which bear a trademark that is identical to, or indistinguishable from, a trademark registered to another party and that infringes the rights of the holder of the trademark.

The term "counterfeit medicine" is a chemical entity which is deliberately and fraudulently mislabeled with respect to identity and/or source and may include products with the correct ingredients but fake packaging, with the wrong ingredients, without active ingredients or with insufficient active ingredients.

The term "counterfeited materials" are unauthorized materials whose special characteristics are protected as intellectual property rights, patents and copyrights.

The term "diversion" means the sale or distribution of legitimate products outside of intended markets.

The term "falsified products" are deliberately/fraudulently sold products which misrepresent their identity, composition or source, including those which are substandard and obsolete and mis-represented as functional.

The term "relatively high impedance electrical current path" and "relatively low impedance electrical current path" are relative terms, where the "relatively high impedance electrical current path" has an impedance that is significantly larger than the "relatively low impedance electrical current path"; in embodiments, the "relatively high impedance electrical current path" can have an impedance that is at least 1,000 times that of the "relatively low impedance electrical current path"; in other embodiments, the "relatively high impedance electrical current path" can have an impedance that at least 10,000 times that of the "relatively low impedance electrical current path"; and in still other embodiments, the "relatively high impedance electrical current path" can have an impedance that at least 100,000 times that of the "relatively low impedance electrical current path."

The term "imitation products" are indirect copies (i.e., imitation smartphones) that recreate an overall similarity, even if the details of the packaging differ between a well-established brand and the imitator's own-label product.

The term "intrusion" means a physical break (e.g., puncture) of the multilayer laminate structure which leads to a detectable change in the electrical impedance between opposed layers of the multilayer laminate.

The term "over-run product" means a legitimate product which has been made in excess of production agreements.

The term "product counterfeiting" means unauthorized representation of a registered trademark carried on goods identical or similar to goods for which the trademark is registered, with a view to deceiving the purchaser into believing that he/she is buying the original goods.

The term "sensing" means the function or operation of the multilayer laminate structure to detect an intrusion.

The term "siphoned product" means any product which has had a part (e.g., volume) removed and is represented as being whole.

The term "spurious product" means any product which purports in name, identity, color, pattern, design or content to be real and is fake.

The term "SSSFFCC Product" means any one of siphoned, substandard, spurious, falsely-labeled, falsified, or counterfeit products.

The term "substandard product" (aka "out-of-specification product") means authorized products that fail to meet either their quality standards or specifications, or both.

The term "substandard drugs" are genuine medicines and medical devices that have not passed the quality testing protocols previously set for each product (e.g., have incorrect quantity of active ingredient, which could be secondary to excessive decomposition of active ingredient as a result of high temperature and humidity, and poor-quality assurance during the manufacture of pharmaceutical products in less-developed countries).

The term "tampered product" is a legitimate product and associated packaging which is being used in a fraudulent way.

The term "stolen product" is a legitimate product stolen and passed-off as legitimately procured.

The term "unregistered or unlicensed medical products" are medical products that have not undergone evaluation and/or approval by a national or regional regulatory authority for the market in which they are marketed/distributed or used, subject to permitted conditions under national or regional regulation and legislation.

The present disclosure includes a packaging system that employs a sensing barrier or surface that protects at least one article. The sensing barrier is formed from a multilayer laminate structure that includes an encapsulated transformative material that is disposed between first and second conductive layers. The transformative material is configured to undergo a state change (for example, by a chemical reaction or physical change) that changes impedance between the first and second conductive layers in response to intrusion. An NFC/RFID circuit is electrically coupled to the first and second conductive layers of the multilayer laminate structure. At least one operational characteristic of the NFC/RFID circuit is dependent on the change in impedance between the first and second conductive layers of the multilayer laminate structure as provided by the transformative material in response to the intrusion. The operational characteristic of the NFC/RFID circuit can be ascertained and analyzed (for example, by suitable operations of an external NFC/RFID interrogator) to detect the intrusion and provide an indication of the intrusion if and when detected.

Figure 1B:
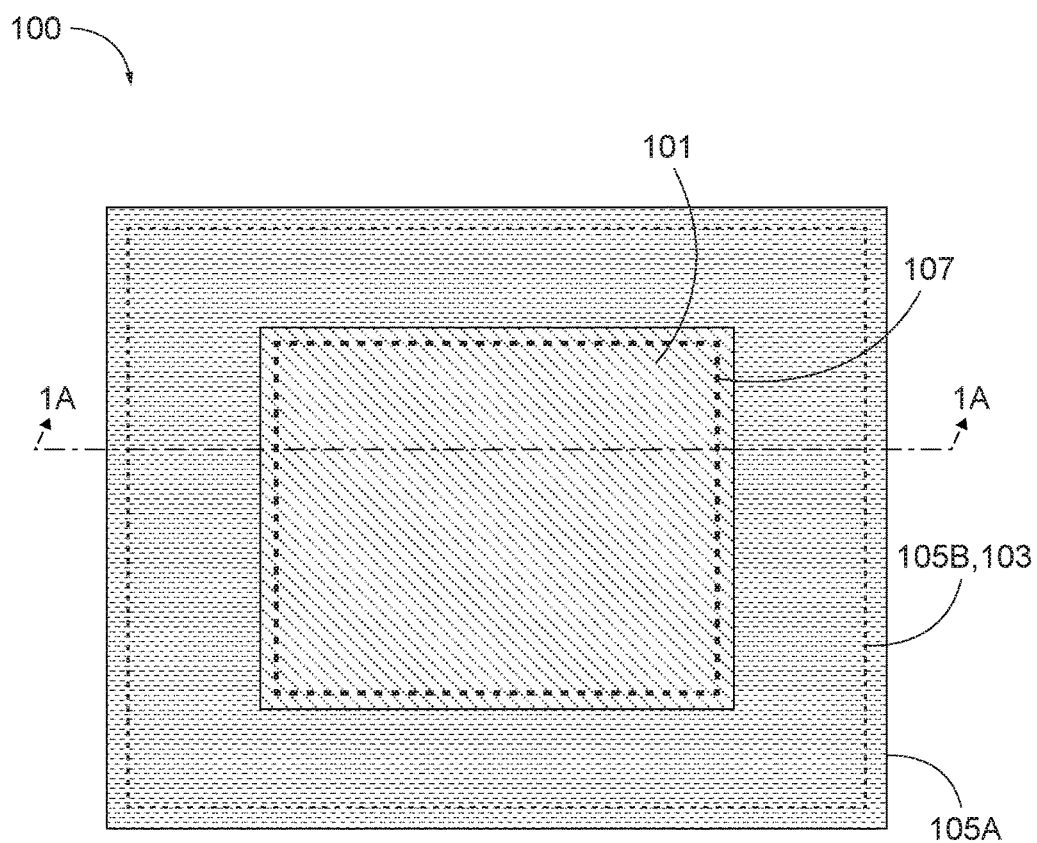
FIG. 1B is a schematic bottom view of the multilayer laminate structure of FIG. 1A.
Figure 1C:
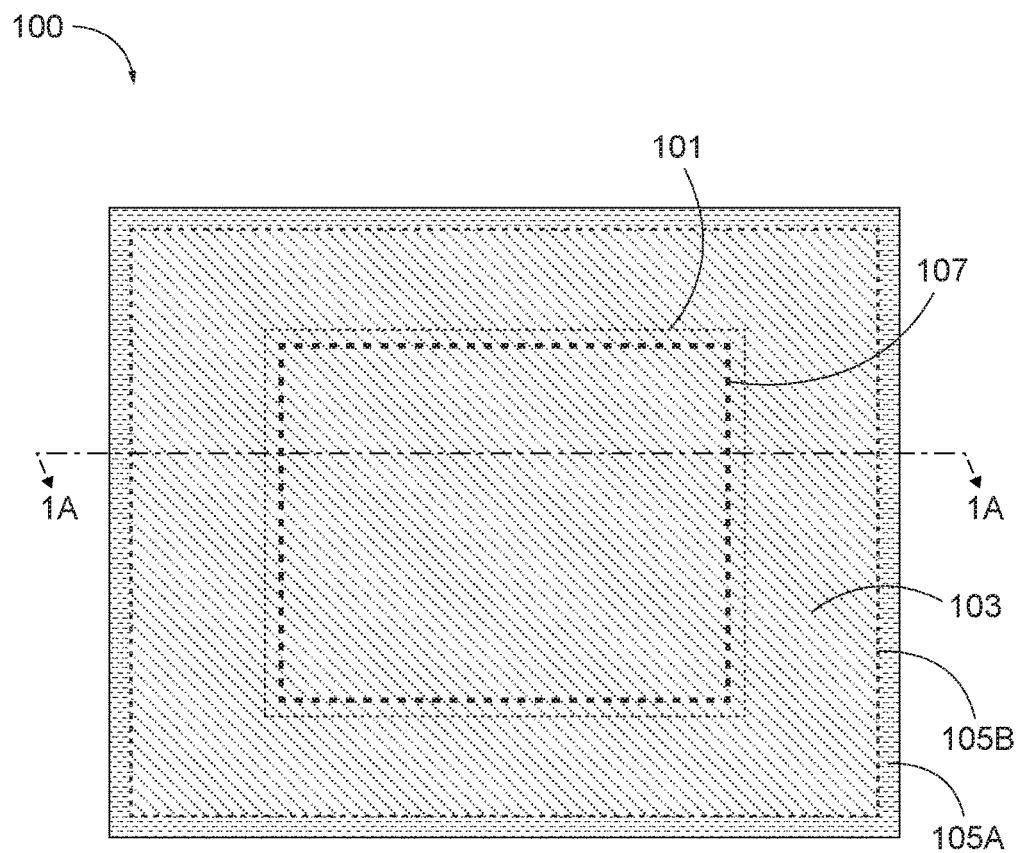
FIG. 1C is a schematic top view of the multilayer laminate structure of FIG. 1A.

FIGS. 1A, 1B and 1C show an example flexible multilayer laminate structure 100 that can be used to form the sensing barrier of the packaging system, which includes a first conductive layer 101, a second conductive layer 103, and intermediate layers 105A and 105B that encapsulate transformative material 107 disposed between the first and second conductive layers 101, 103. The layers may be thin flexible sheets such that the multilayer laminate structure 100 is flexible in nature and thus is able to bend or fold. In embodiments, the multilayer laminate structure 100 can be formed by suitable printing technologies, such as continuous gravure or rolled based printing, stamp printing or inkjet printing. Various microprinting technologies can also be used if desired.

Figure 4:
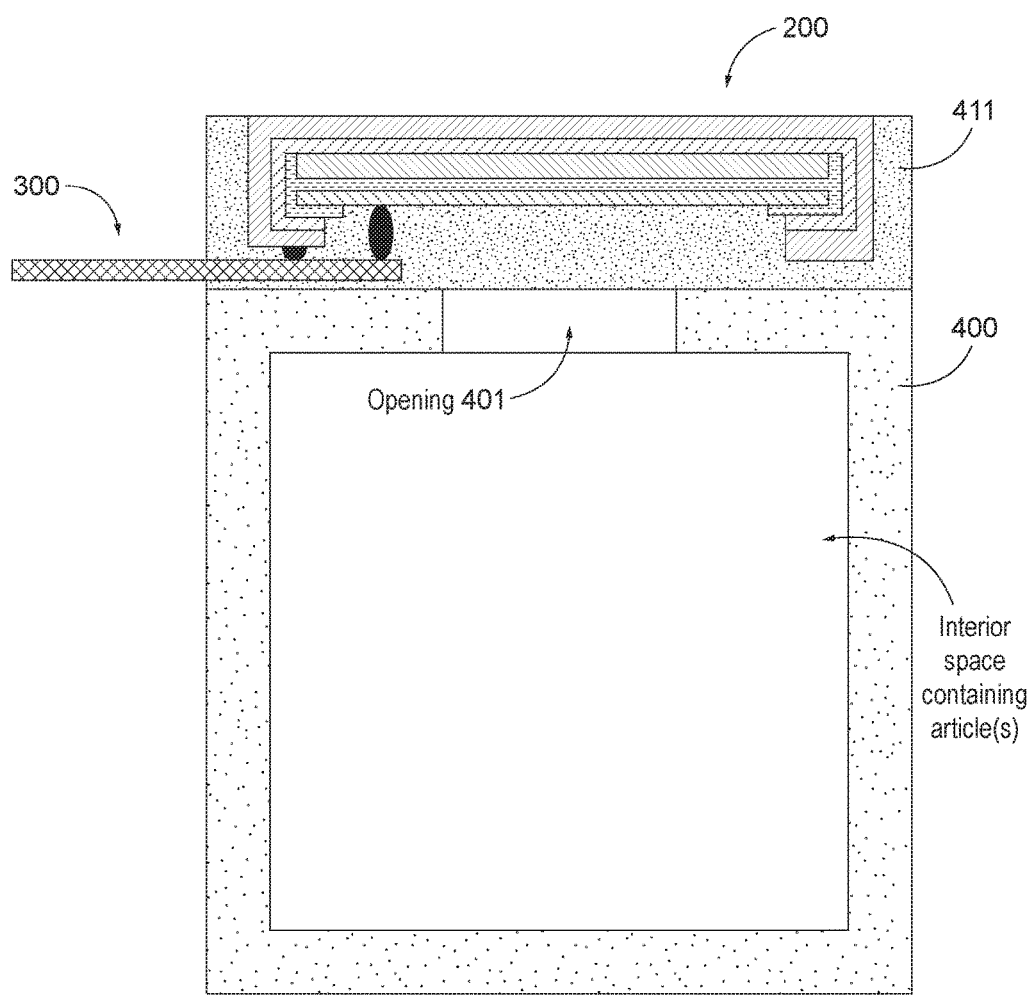
FIG. 4 is a schematic view of the packaging system of FIGS. 3A-3B providing a barrier that covers an opening of a rigid-walled container.
Figure 5A:
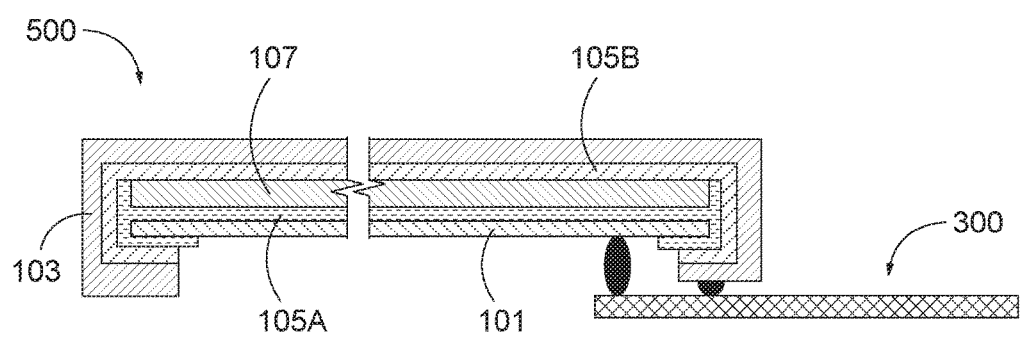
FIG. 5A is a schematic cross-sectional view of another example packaging system that employs the multilayer laminate structure of FIGS. 1A-1C together with an NFC/RFID circuit and coil antenna.
Figure 5B:
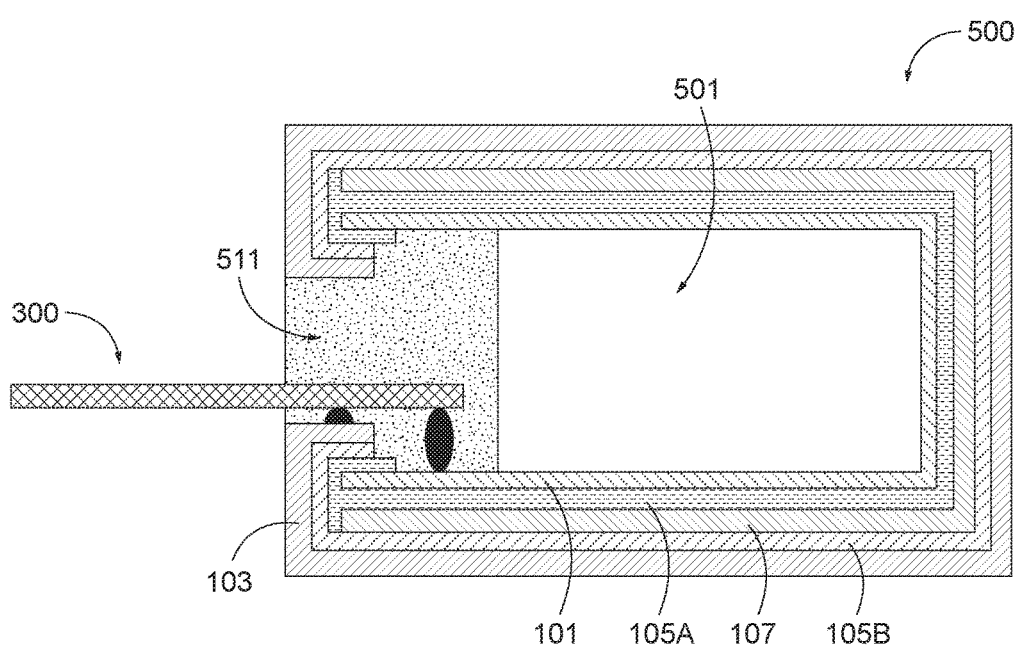
FIG. 5B is a schematic cross-sectional view of the packaging system of FIG. 5A that is folded to provide barrier that defines a sealed envelope or pouch or box.

The transformative material 107 may include, for instance, a metal ion solution such as silver nitrate gel solution with silver ions that precipitate as solid-phase silver by a galvanic displacement reaction with certain noble metals. The first and second conductive layers 101 and 103 can be formed from a conductive material (e.g., a noble metal such as copper, magnesium, zinc, or tin) that undergoes a galvanic displacement reaction with a transformative material, such as for instance, silver ions of a silver nitrate gel solution 107 to precipitate solid-phase silver from the silver nitrate gel solution. Other metal ion solutions can be paired with other noble metals that support the galvanic displacement reaction with the metal ion solution and precipitates solid-phase metal from the solution. The intermediate layer 105A can be formed from a thin film of a conductive material (such as a conductive polymer). The intermediate layer 105B can be formed from a thin film of electrically-insulating material such as polyethylene terephthalate (PETG), photo-resistant polymer, Mylar, a spun polymer with a metallic oxide coating, or other encapsulating or insulating material. Alternately, the intermediate layer 105B can be formed from a hard electrically-insulating material, such as a hard polymer film of Kapton and/or Mylar and/or BoPET or another hard polymer than can be spin-coated or dip coated. The hardness of the polymer film can be in the range of shore 40D to shore 80D or higher. The thickness of the polymer film can range from 5 microns to 20 microns. Alternately, the intermediate layer 105B can be formed from a hard thin-film electrically-insulating ceramic material, such as silicon oxide, aluminum oxide, silicon nitride, titanium nitride, titanium oxide, zirconium tetrafluoride and combinations thereof. The hardness of the thin-film ceramic material can be in the range of shore 40D to shore 80D or higher. The thickness of the thin-film ceramic material can range from 0.1 microns to 1 micron. Alternatively, the intermediate layer 105B can be formed from a thin film of conductive material (such as the same or different conductive polymer as that of 105A). The intermediate layers 105A and 105B encapsulate the transformative material (silver nitrate gel solution) 107 between the first and second conductive layers 101, 103 as shown. The intermediate layer 105A can extend laterally beyond the intermediate layer 105B and the second conductive layer 103 as shown. The first conductive layer 101 can cover the transformative material 107 as shown and is typically positioned facing the package product and closest to the packaged product, while the second conductive layer 103 is typically positioned facing away from the package product and furthest from the packaged product (FIGS. 4 and 5B).

Note that in this configuration the conductive material of the intermediate layer 105A can be selected such that it does not undergo a galvanic displacement reaction with the silver metal ion solution (e.g., the silver nitrate gel solution that precipitates solid-phase silver). In this configuration, the metal(s) of the first conductive layer 101 would undergo a galvanic displacement reaction with metal ions of the metal ion solution if in contact with the metal ion solution, but it is inhibited from doing so by the intervening intermediate layer 105A. Furthermore, the material of the intermediate layer 105B can be selected such that it does not undergo a galvanic displacement reaction with the metal ion solution that precipitates the solid-phase metal. In this configuration, the metal(s) of the second conductive layer 103 would undergo an irreversible galvanic displacement reaction with metal ions of the metal ion solution if in contact with the metal ion solution, but it is inhibited from doing so by the intervening intermediate layer 105B.

Figure 2A:
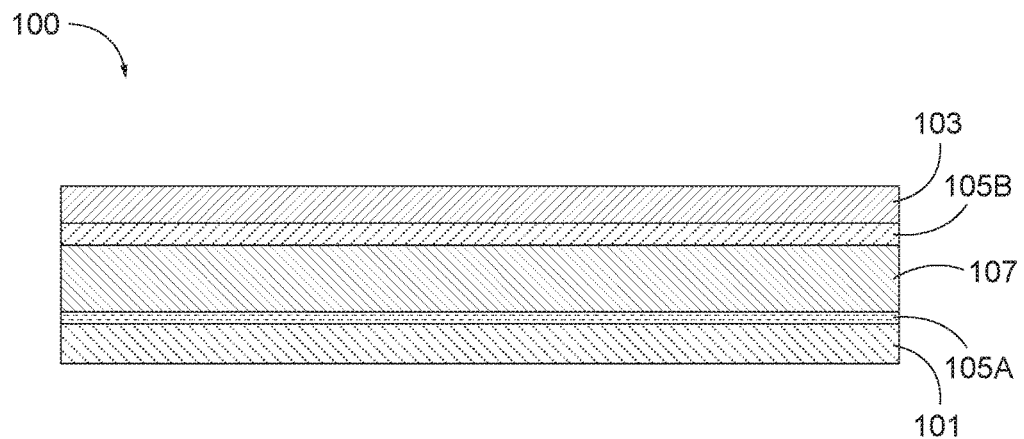
FIGS. 2A-2D are schematic views of an exemplary intrusion through the multilayer laminate structures of FIGS. 1A-C and the galvanic displacement reaction and resulting structural and electrical changes to the multilayer laminate structure that result from such intrusion.

Note that under normal conditions absent intrusion, the multilayer laminate structure 100 has configuration that provides a relatively high impedance electrical current path between the first and second conductive layers 101 and 103 as shown in FIG. 2A. However, in response to an intrusion event, the multilayer laminate structure 100 automatically reconfigures itself to a different configuration where metal ions of the metal ion solution (e.g., silver ions of a silver nitrate gel solution) precipitate to form solid-phase metal (e.g., silver) that provides part or all of a relatively low impedance electrical current path between the first and second conductive layers 101 and 103 as shown in FIGS. 2B to 2D.

Figure 2B:
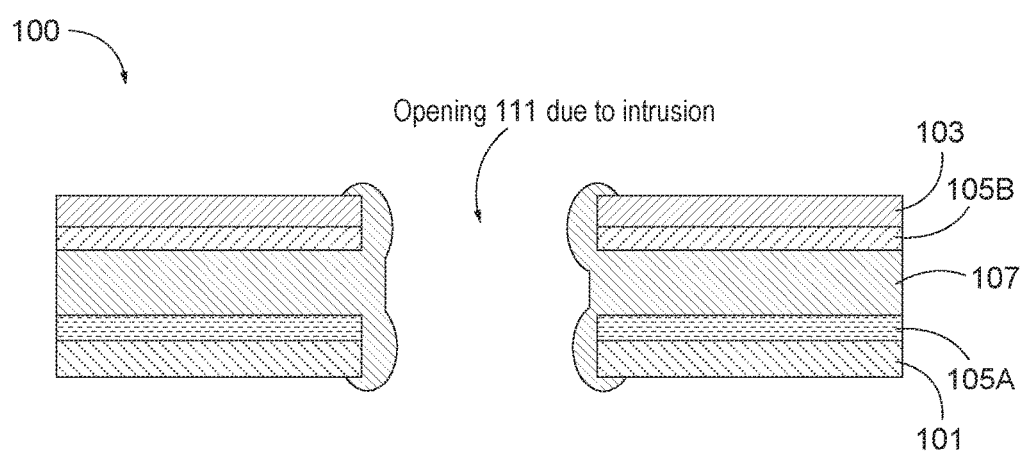
Figure 2C:
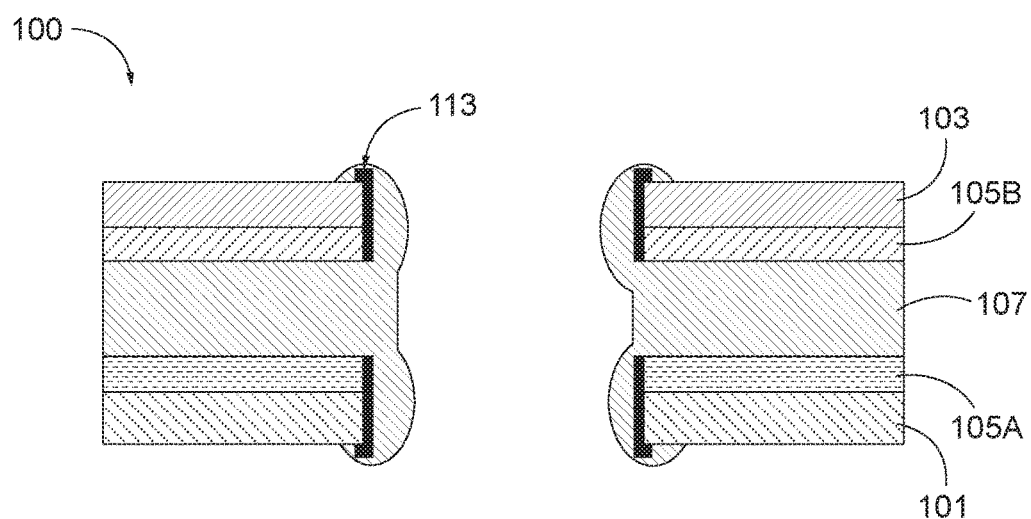

More specifically, an intrusion event can form an opening 111 that extends completely through the first and second conductive layers 101, 103 of the multilayer laminate structure as shown in FIG. 2B. In response to such intrusion, the metal ion solution (e.g., silver nitrite gel solution) can be displaced (or flow) through this opening 111 and contact both the first and second conductive layers 101, 103 as shown. The metal ion solution (e.g., silver nitrite gel solution) by itself is conductive. Thus, if sufficient metal ion solution is present in the space between the first and second conductive layers 101 and 103, the initial displacement (flow) of the metal ion solution (e.g., silver nitrite gel solution) can form all or part of a low impedance current path between the first and second conductive layers 101 and 103.

Furthermore, with the metal ion solution (e.g., silver nitrite gel solution) in contact with the appropriate metal(s) of the first and second conductive layers 101 and 103, the metal ion solution (e.g., silver nitrite gel solution) can undergo a galvanic displacement reaction that precipitates solid-phase metal (e.g., silver) in response to the intrusion. The solid-phase metal (e.g., silver) precipitate can extend from the second conductive layer 103 through the adjacent intermediate layer 105B as shown in FIG. 2C. The metal ion solution 107 by itself is conductive. Thus, if sufficient metal ion solution 107 (e.g., silver nitrite gel solution) is present in the space between the deposited solid-phase metal (e.g., silver) and the intermediate layer 105A or the first conductive layer 101, the solid-phase metal precipitate (e.g., silver) in conjunction with the metal ion solution (e.g., silver nitrite gel solution) can form all or part of a relatively low impedance electrical current path between the first and second conductive layers 101 and 103.

Figure 2D:
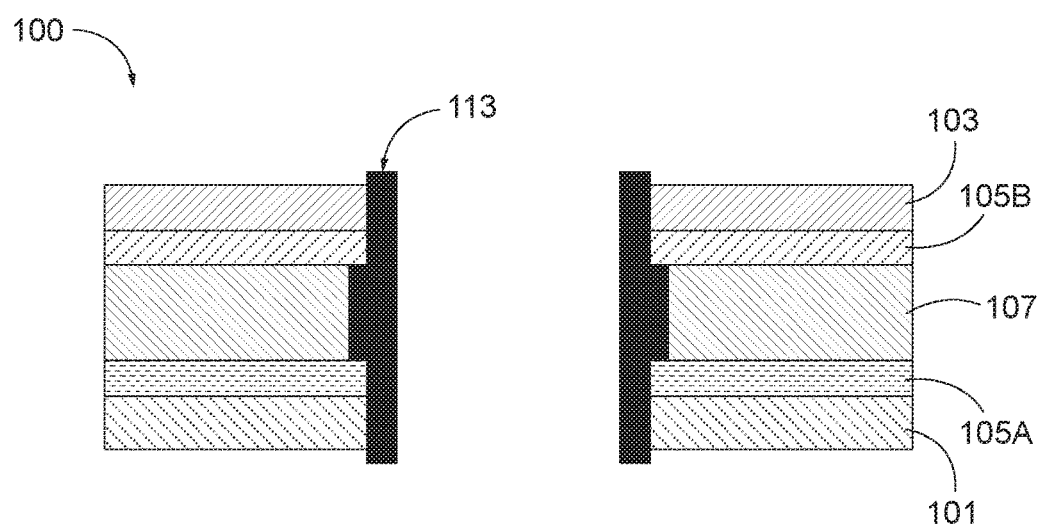

Moreover, the precipitation of the solid-phase metal (e.g., silver) can continue such that the solid-phase metal precipitate extends between first and second conductive layers 101 and 103 as shown in FIG. 2D. In this manner, the solid-phase metal precipitate alone (e.g., silver), without any conductive metal ion solution (e.g., silver nitrate gel solution), can form all or part of a relatively low impedance electrical current path between the first and second conductive layers 101 and 103.

In this manner, the multilayer laminate structure 100 can function under normal conditions as a flexible two-plate capacitor with the first and second conductive layers equivalent to the two plates of the capacitor, and the encapsulated metal ion solution 107 equivalent to the dielectric medium between the two plates. As a two-plate capacitor, the multilayer laminate structure 1000 provides a relatively high impedance electrical current path between the first and second conductive layers 101 and 103. In response to the intrusion, the metal ion solution can flow or undergo a galvanic reaction that provides part or all of a relatively low impedance electrical current path between the first and second conductive layers 101 and 103.

Figure 3A:
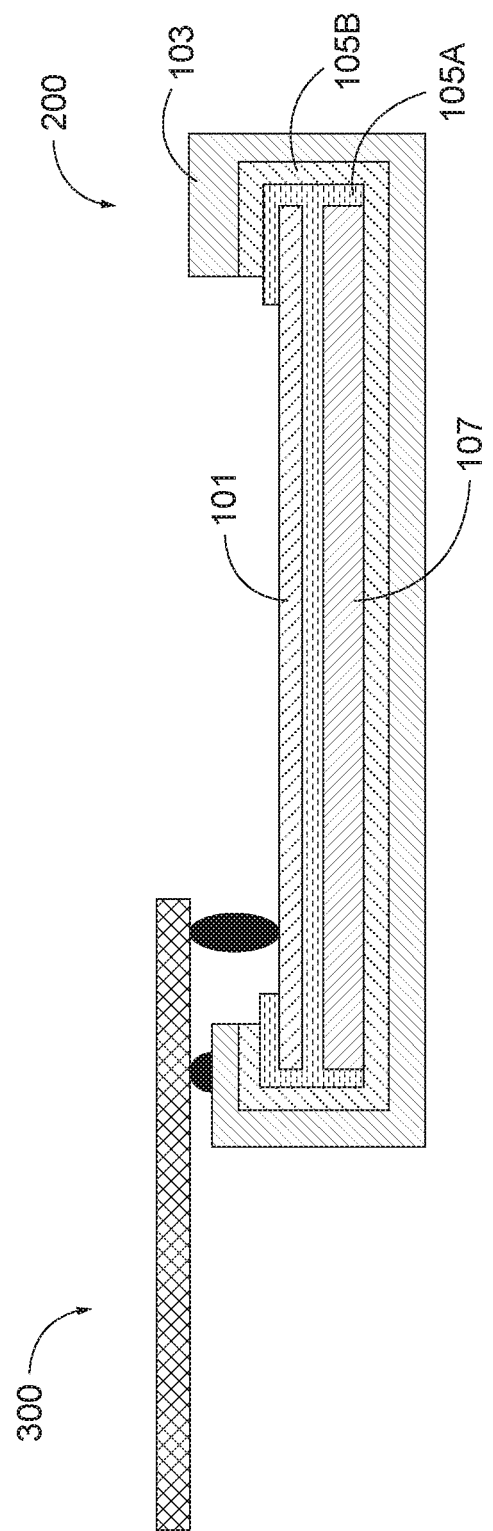
FIG. 3A is a schematic cross-sectional view of an example packaging system that employs the multilayer laminate structure of FIGS. 1A-1C together with an NFC/RFID circuit and coil antenna.
Figure 3B:
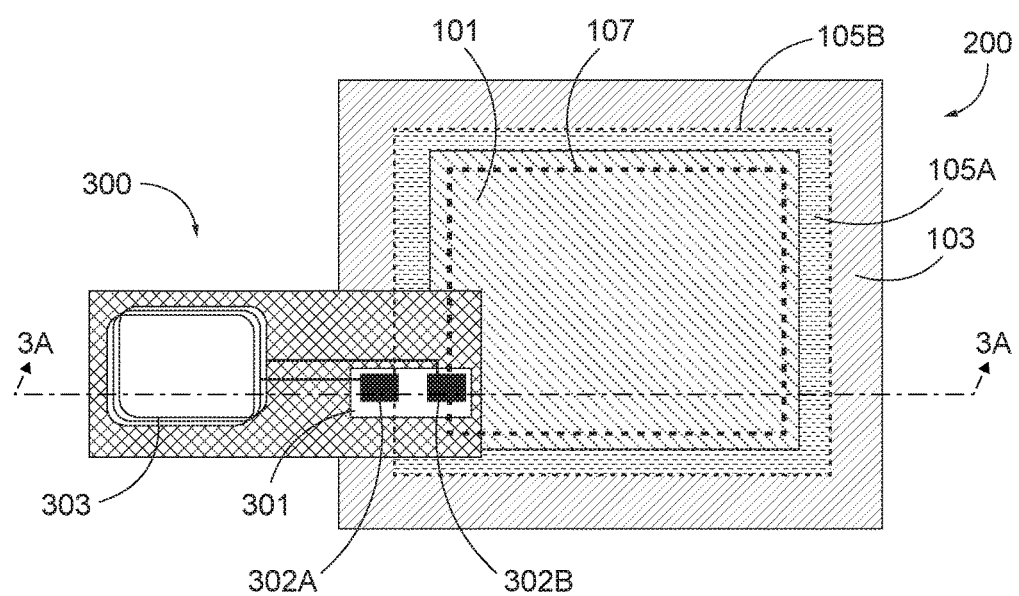
FIG. 3B is a schematic top view of the packaging system of FIG. 3A.

FIGS. 3A and 3B are schematic diagrams that illustrate an exemplary embodiment where the multilayer laminate structure of FIGS. 1A to 1C is folded about four opposite edges such that second conductive layer 103 surrounds the perimeter of resulting structure 200 with a portion that faces the same direction as the first conductive layer 101. In this configuration, a sub-assembly or tag 300 that includes an NFC/RFID circuit 301 and two-terminal coil antenna 303 (e.g., a copper trace antenna) is mounted or otherwise supported on the multilayer laminate structure 200, particularly on the first conductive layer 101 and the portion of second conductive layer 103 that faces the same direction as the first conductive layer 101 as shown. The NFC/RFID circuit 301 and two-terminal coil antenna 303 (e.g., a copper trace antenna) can be mounted or otherwise supported on the multilayer laminate structure 200 by suitable interconnect means. In embodiments, the tag 300 can include a flexible substrate with the coil antenna 303 printed or otherwise supported on the flexible substrate. The NFC/RFID circuit 301 can also be supported by the flexible substrate. Although any number of materials may be used for the flexible substrate, the flexible substrate may be a flexible polyethylene terephthalate (PETG) film.

The NFC/RFID circuit 301 includes two coil input terminals 302A, 302B that are electrically connected to the two terminals of the coil antenna 303. The NFC/RFID circuit 301 can cooperate with the coil antenna 303 to exchange data with an external NFC/RFID interrogator using radio frequency (RF) signals as is well known. The NFC/RFID circuit 301 is a passive-type NFC/RFID device which does not contain a battery, but instead includes power management circuitry that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID circuit 301 for activation of the circuit elements. The circuit elements typically include modulator/demodulator circuitry that demodulates the radio signals that are transmitted by the NFC/RFID interrogator and received by the antenna circuitry and that modulates radio signals that are transmitted by the antenna to the NFC/RFID interrogator, and a controller and non-volatile memory for processing and storing data.

In embodiments, the NFC/RFID circuit 301 can be an integrated circuit package that is fabricated using semiconductor manufacturing processes. For example, the NFC/RFID circuit 301 can be realized by commercially-available NFC/RFID circuits, such as the ST25DV04K, ST25DV16K and ST25DV64K NFC circuit sold commercially by STMicroelectronics. Other suitable NFC/RFID circuits can also be used. The RF signals communicated between the NFC/RFID circuit 301 and the NFC/RFID interrogator can conform to one or more standards. For example, ISO/IEC 14443, ISO/IEC 15693, ISO/IEC 118000 and EPC Global UHF Class 1 Generation 2 are common standards supported by NFC/RFID circuits and NFC/RFID interrogators.

In the embodiment of FIGS. 3A and 3B, the two terminals of the coil antenna 303 (together with the corresponding coil antenna input terminals 302A, 302B of the NFC/RFID circuit 301) are electrically connected to the first and second conductive layers 101 and 103 of the folded multilayer laminate structure 200 by a suitable interconnect structure. The interconnect structure can also provide mechanical support of the sub-assembly 300. For example, two ball-type interconnects can be used as shown. In this configuration, under normal conditions absent intrusion, the multilayer laminate structure 200 provides a relatively high impedance electrical current path between the first and second conductive layers 101 and 103 and between the two antenna terminals 302A and 302B electrically coupled thereto. The relatively high impedance current path between the two antenna terminals 302A and 302B allows the NFC/RFID circuit 301 to harvest power from the electromagnetic radiation provided by an external NFC/RFID interrogator and use such harvested power as supply to the electrical components of the NFC/RFID circuit 301 for its operations. In response to intrusion through the multilayer laminate structure, the transformative material 107 of the folded multilayer laminate structure 200 can adapt to provide all or part of a relatively low impedance electrical current path between the first and second conductive layers 101 and 103 and between the two antenna terminals 302A and 302B electrically coupled thereto. Such relatively low impedance electrical current path automatically configures the NFC/RFID circuit 301 to remain in a power-off state in the presence of electromagnetic radiation that is normally sufficient to provide electrical power to the NFC/RFID circuit 301. In this manner, if the NFC/RFID circuit 301 remains in a power-off state in the presence of electromagnetic radiation provided by an external NFC/RFID interrogator that is normally sufficient to provide electrical power to the NFC/RFID circuit 301, the external NFC/RFID interrogator 301 can sense this power-off state, interpret this power-off state as a signal of the intrusion, and output an indication (e.g., visual or audible notification) of the intrusion if and when the intrusion is detected.

For example, in one case for purposes of illustration, the relatively high impedance electrical current path can be on the order of 10 megaohms and the relatively low impedance current path can be on the order of 100 ohms to 1 ohms such that the relatively high impedance electrical current path" is on order of $10^5$ to $10^6$ times larger than the relatively low impedance electrical current path. Other configurations can be implemented where the relatively high impedance electrical current path is less than or more than these values and where the relatively low impedance current path is less than or more than these values.

In embodiments, the packaging system as described herein (the multilayer laminate structure with NFC/RFID circuit and coil antenna) can be used as a sensing barrier that protects the opening into a rigid closed-wall container (such as glass bottle) that houses at least one article. For example, FIG. 4 shows an example embodiment where the folded multilayer laminate structure 200 of FIGS. 3A and 3B is secured with a sealant 411 about an opening 401 into a rigid closed-wall container (such as glass bottle) 400. In this configuration, the packaging system provides a partly or wholly sealed protective barrier that can detect intrusion through the protective barrier and possibly into the interior space of the container. Note that the multilayer laminate structure 200 extends laterally across the upper wall of the container 400 beyond the opening 401, which offers protection for intrusion at the sealed interface between the container and the barrier. In embodiments, the sealant 411 can be an epoxy thermoset sealant, which can be cured by UV light, heat or other means.

In other embodiments, the packaging system as described herein (which includes multilayer laminate structure with NFC/RFID circuit and coil antenna) can be used as a sensing barrier that defines and protects a sealed envelope or pouch or box. FIGS. 5A and 5B are schematic diagrams that illustrate an exemplary embodiment where the multilayer laminate structure of FIGS. 1A to 1C is configured in a folded arrangement to define a sealed envelope or pouch or box 500 with a space 501 that houses the at least one article. The folded arrangement has edges sealed by a sealant 511. In embodiments, the sealant 511 can be an epoxy thermoset sealant, which can be cured by UV light, heat or other means. In the folded arrangement, the second conductive layer 103 surrounds the perimeter of resulting structure 500 and faces the same direction as the first conductive layer 101. An NFC/RFID subassembly 300 as described above is mounted and electrically connected to the first and second conductive layers of the folded multilayer laminate structure in a similar manner as described above with respect to FIGS. 3A and 3B. In this configuration, the multilayer laminate structure provides a protective sensing barrier that can detect intrusion through the protective barrier into the internal space 501 of the envelope or pouch or box 500.

Figure 6A:
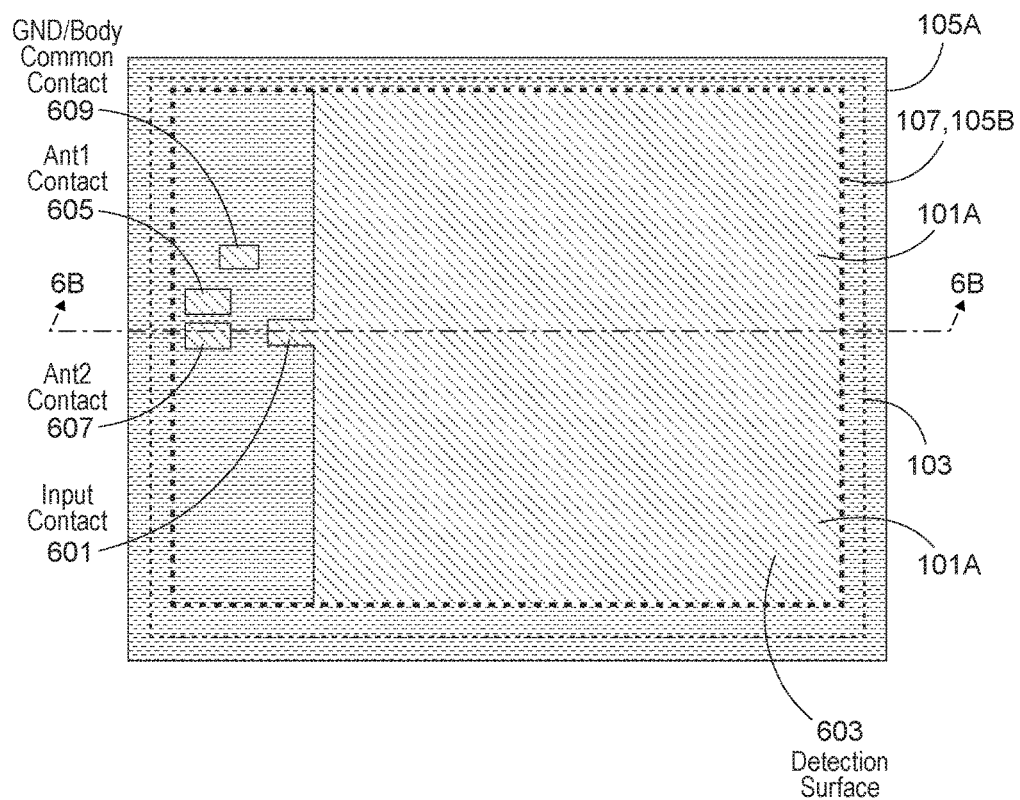
FIG. 6A is a schematic top view of another exemplary multilayer laminate structure that can be used in packaging systems according to the present disclosure.
Figure 6B:
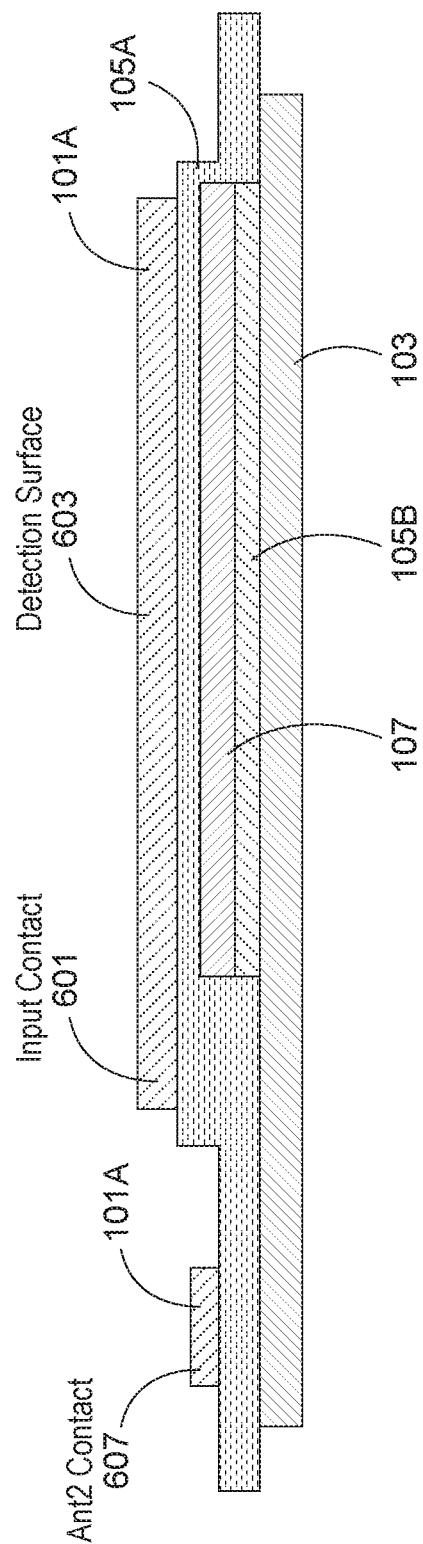
FIG. 6B is a schematic cross-sectional view of the multilayer laminate structure of FIG. 6A.

FIGS. 6A and 6B illustrate another embodiment where the first conductive layer 101A of the multilayer laminated structure is patterned (for example, by etching or printing or stamping) to define local features formed from the first conductive layer 101A, which include an input contact 601 that extends to a detection surface 603, two distinct antenna contacts 605 and 607, and a ground or common body contact 609. The input contact 601, the two distinct antenna contacts 605 and 607, and the ground or common body contact 609 are configured to interconnect to corresponding terminals of a suitable NFC/RFID circuit 301A (see FIGS. 7 and 8). The transformative material 107 is encapsulated by the intermediate layers 105A, 105B in the area that underlies the detection surface 603. In response to intrusion through the multilayer laminate structure in the vicinity of the detection surface 603, the transformative material 107 of the multilayer laminate structure can adapt to change the impedance between the detection surface 603 and the other conductive layer 103.

Figure 7:
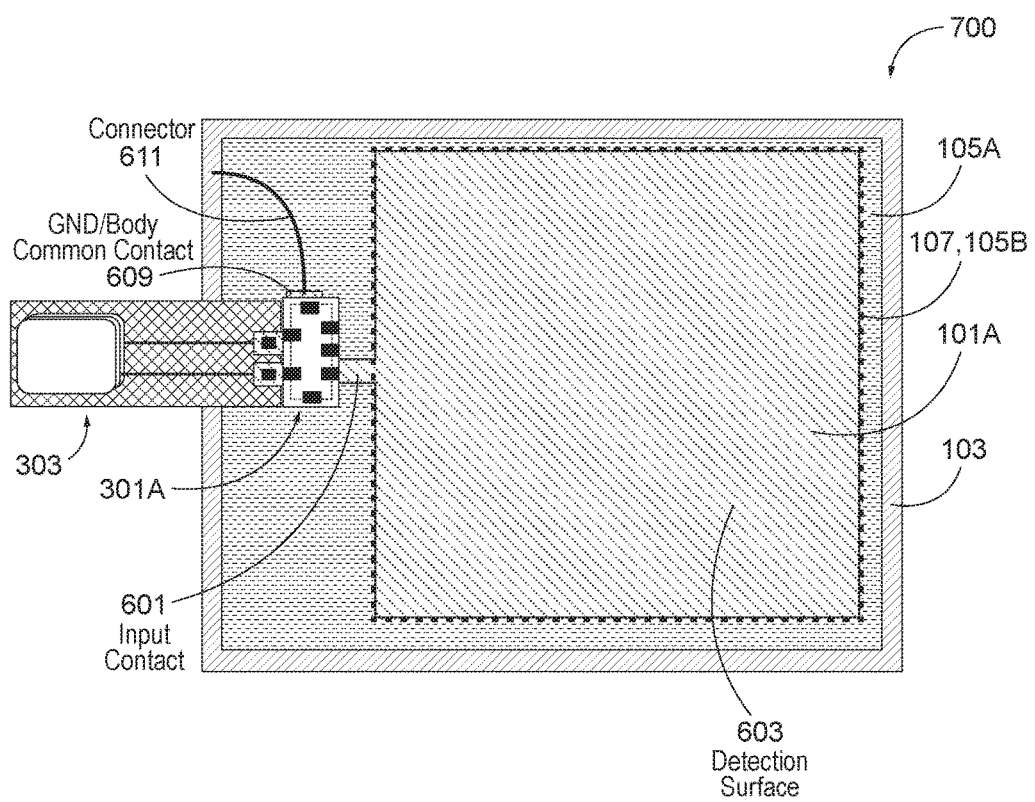
FIG. 7 is a schematic top view of an example packaging system that employs the multilayer laminate structure of FIGS. 6A-6B together with an NFC/RFID circuit and coil antenna.

FIG. 7 is a schematic diagram that illustrates an exemplary embodiment where the multilayer laminate structure of FIGS. 6A and 6B is folded about four opposite edges such that second conductive layer 103 surrounds the perimeter of resulting structure 700 with a portion that faces the same direction as the first conductive layer 101. In this configuration, an NFC/RFID circuit 301A and two-terminal coil antenna 303 (e.g., a copper trace antenna) are mounted or otherwise supported on the folded multilayer laminate structure 500, particularly on the first conductive layer 101 and the portion of second conductive layer 103 that faces the same direction as the first conductive layer 101 as shown. The NFC/RFID circuit 301A and two-terminal coil antenna 303 can be mounted or otherwise supported on the folded multilayer laminate structure 500 by suitable interconnect structures. In embodiments, the coil antenna 303 can printed or otherwise supported on a flexible substrate. Although any number of materials may be used for the flexible substrate, the flexible substrate may be a flexible polyethylene terephthalate (PETG) film.

Figure 8:
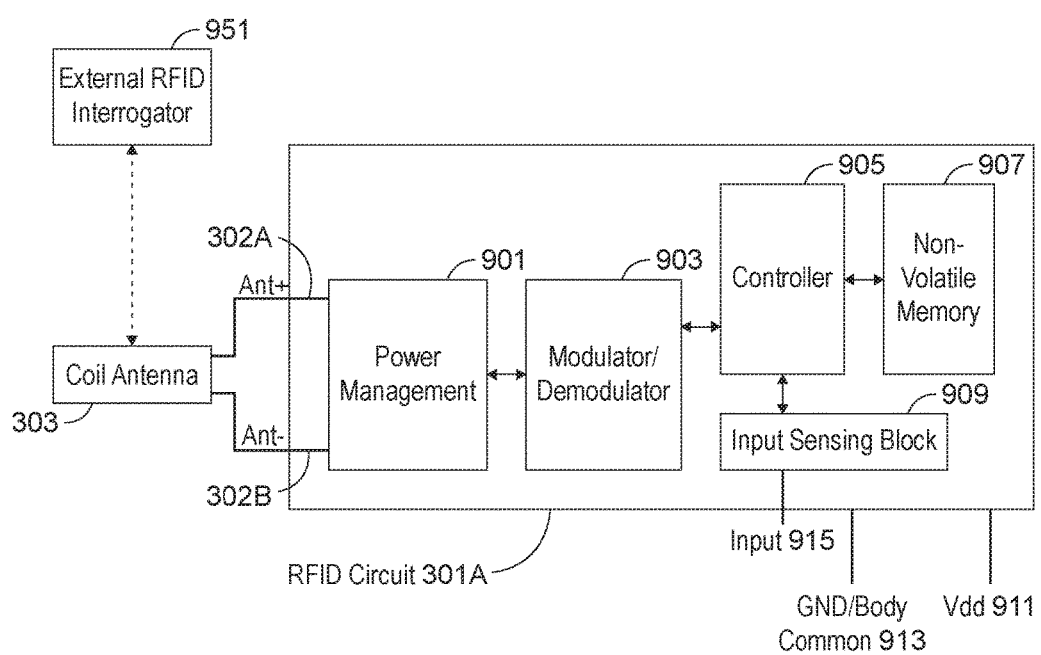
FIG. 8 is a functional block diagram of the NFC/RFID circuit and coil antenna of FIG. 7, which shows the electrically interconnection between these components and the RF interface to an external NFC/RFID interrogator.
Figure 9:
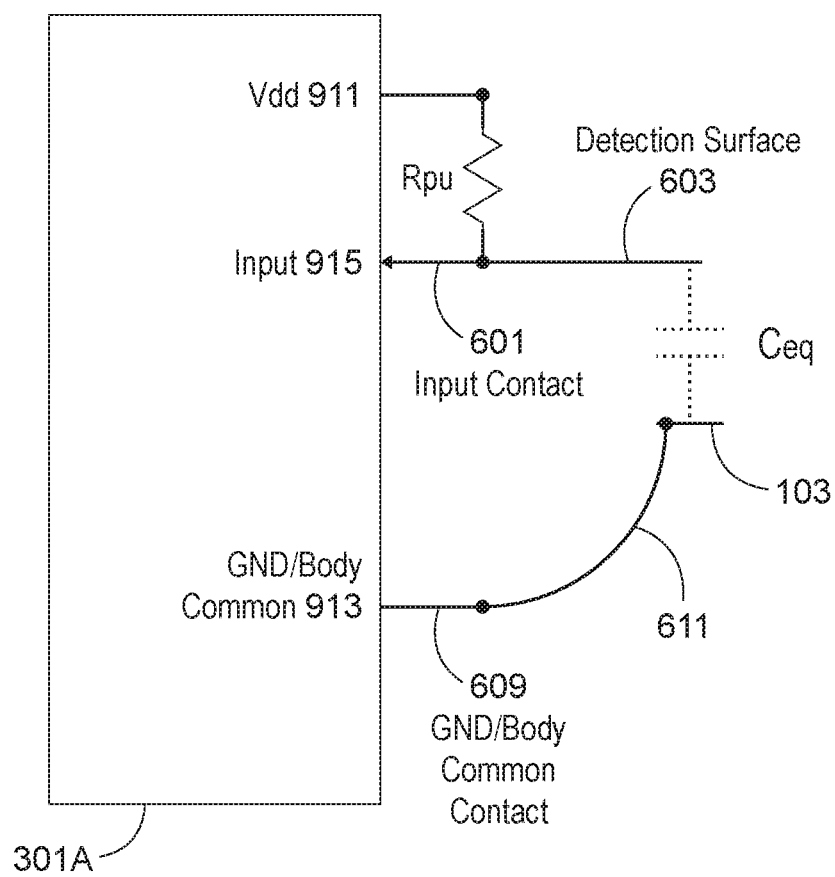
FIG. 9 is a functional block diagram showing electrical interconnection between certain terminals of the NFC/RFID circuit and the multilayer laminate structure of FIG. 7.

As shown in FIG. 8, the NFC/RFID circuit 301A includes two coil input terminals 302A, 302B, a Vdd terminal 911, a GND or Body Common terminal 913, and an input terminal 915. The two coil input terminals 302A, 302B are electrically interconnected to the two distinct antenna contacts 605 and 607 of the patterned conductive layer 101 by a suitable interconnect structure (such as ball-type interconnect). The Vdd terminal 911 and the input terminal 915 are electrically connected to a pull-up resistor Rpu as shown in FIG. 9. The pull-up resistor Rpu can be mounted on and supported by the structure 700 (or on some other part) and interconnected to the terminals 911, 915 by conductive traces (e.g., layer 101A) or by soldered insulating wires or other suitable means. The input terminal 915 is electrically interconnected to the input contact 601 of the patterned conductive layer 101 by a suitable interconnect structure (such as ball-type structure), which provides electrical connection between the input terminal 915 and the detection surface 605. The GND or Body Common terminal 913 is electrically interconnected to the GND/Body Common contact 609 of the patterned conductive layer 101 by a suitable interconnect structure (such as ball-type structure). A connector 611, which can be a soldered insulating wire or other suitable means, provides electrical connection between the GND/Body Common contact 609 and the second conductive layer 103, and thus provides electrical connection between the GND or Body Common terminal 913 and the second conductive layer 103.

The NFC/RFID circuit 301A can cooperate with the coil antenna 303 to exchange data with an external NFC/RFID interrogator 951 using radio frequency (RF) signals as is well known. The NFC/RFID circuit 301A is a passive-type NFC/RFID device which does not contain a battery, but instead includes power management circuitry 901 that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID circuit 301A for activation of the circuit elements. The circuit elements can include modulator/demodulator circuitry 903 that demodulates the radio signals that are transmitted by the NFC/RFID interrogator 951 and received by the coil antenna 303 and that modulates radio signals that are transmitted by the coil antenna 303 to the NFC/RFID interrogator 951, a controller 905 and non-volatile memory 907 for processing and storing data, and an input sensing block 909 that is configured to receive an electrical signal supplied by the input terminal 911 for processing and storage as data by the controller 905. The Vdd terminal 911 outputs a positive voltage supply signal that is generated from the electrical energy harvested and stored by the power management circuitry 901. The GND or Common Body terminal 913 provides an external ground or common body reference potential signal.

In embodiments, the NFC/RFID circuit 301A can be an integrated circuit package that is fabricated using semiconductor manufacturing processes. For example, the NFC/RFID circuit 301A can be realized by commercially-available NFC/RFID circuits, such as the UCODE G2iM+ NFC IC sold commercially by NXP Semiconductors N.V or the SIC4310 NFC IC sold commercially by Silicon Craft Technology. Other suitable NFC/RFID circuits can also be used. The RF signals communicated between the NFC/RFID circuit 301A and the NFC/RFID interrogator 951 can conform to one or more standards. For example, ISO/IEC 14443, ISO/IEC 15693, ISO/IEC 118000 and EPC Global UHF Class 1 Generation 2 are common standards supported by NFC/RFID circuits and NFC/RFID interrogators.

In the embodiment shown in FIGS. 6A and 6B, 7 and 8, the detection surface 603 is electrically coupled to a corresponding input terminal 915 of the NFC/RFID circuit 301A by the circuit elements shown in FIG. 9. Under normal conditions absent intrusion in the vicinity of the detection surface 603, the multilayer laminate structure provides an effective capacitance Ceq (a relatively high impedance electrical current path) between the detection surface 603 and the second conductive surface 103. When an intrusion occurs in the vicinity of the corresponding detection surface 603, the transformative material of the multilayer laminate structure can adapt to provide all or part of a relatively low impedance electrical current path between the detection surface 603 and the other conductive layer 603. Specifically, the capacitance Ceq is transformed to a low-resistance Req. Thus, the voltage signal at the input terminal 915 becomes Vdd*Req/(Rpu+Req), where Rpu is the resistance of the pull-up resistor Rpu. By choosing the appropriate Rpu, the voltage signal at the input terminal 915 sensed for an intrusion will be less than a predefined threshold voltage.

By sensing that the voltage signal at the input terminal 915 is less than the predefined threshold voltage for intrusion, the input sensing block 909 can generate a corresponding digital value representing the detected intrusion event, which can be stored in a register as part of the input sensing block 909 of the NFC/RFID circuit 301A.

In response to one or more commands issued by the external NFC/RFID interrogator 951, the input sensing block 909 of the NFC/RFID circuit 301A can be configured to sense and detect the voltage signal at the input terminal 915 and generate and store a corresponding digital value (data) representing a detected intrusion event when the voltage signal at the input terminal 915 is less than the predefined threshold voltage for intrusion. Furthermore, the controller 905 of the NFC/RFID circuit 301A can be further configured to communicate the data representing the detected intrusion event to the external NFC/RFID interrogator 951. The external NFC/RFID interrogator 951 can analyze the data communicated from the NFC/RFID circuit 301A to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the packaging system of FIGS. 6A and 6B, 7 and 8 (which includes the multilayer laminate structure with NFC/RFID circuit and coil antenna) can be used as a sensing barrier that protects the opening into a rigid closed-wall container (such as glass bottle) that houses at least one article. This is similar to embodiment shown in FIG. 4.

In other embodiments, the packaging system of FIGS. 6A and 6B, 7 and 8 (which includes multilayer laminate structure with NFC/RFID circuit and coil antenna) can be used as a sensing barrier that defines and protects a sealed envelope or pouch or box. This is similar to embodiment shown in FIG. 5B.

In embodiments, the transformative material of the packaging system of FIGS. 6A and 6B, 7 and 8 can include a metal ion solution (e.g., silver nitrate gel solution) that is displaced (or flows) or undergoes a galvanic displacement reaction that precipitates solid-phase metal (e.g., silver) in response to intrusion through the multilayer laminate structure, where the displacement or the precipitation of the solid-phase metal or both changes the impedance between the first and second conductive layers to form a relatively low impedance electrical current path between the first and second conductive layers of the multilayer laminate structure.

Figure 10:
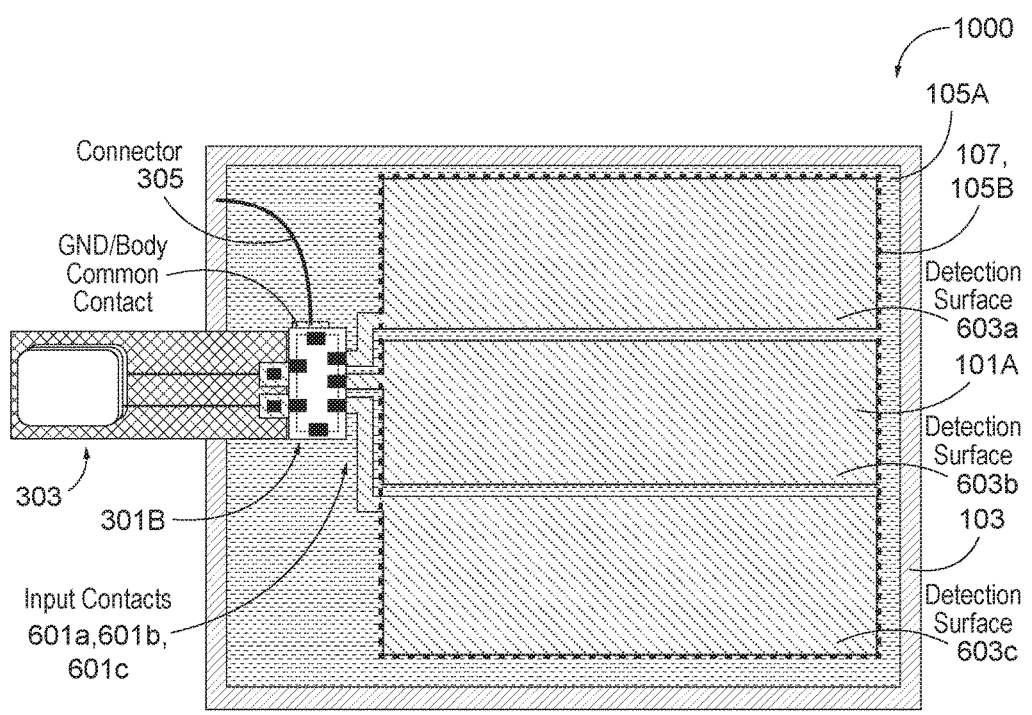
FIG. 10 is a schematic top view of an example packaging system that employs a multilayer laminate structure together with an NFC/RFID circuit and coil antenna.
Figure 11:
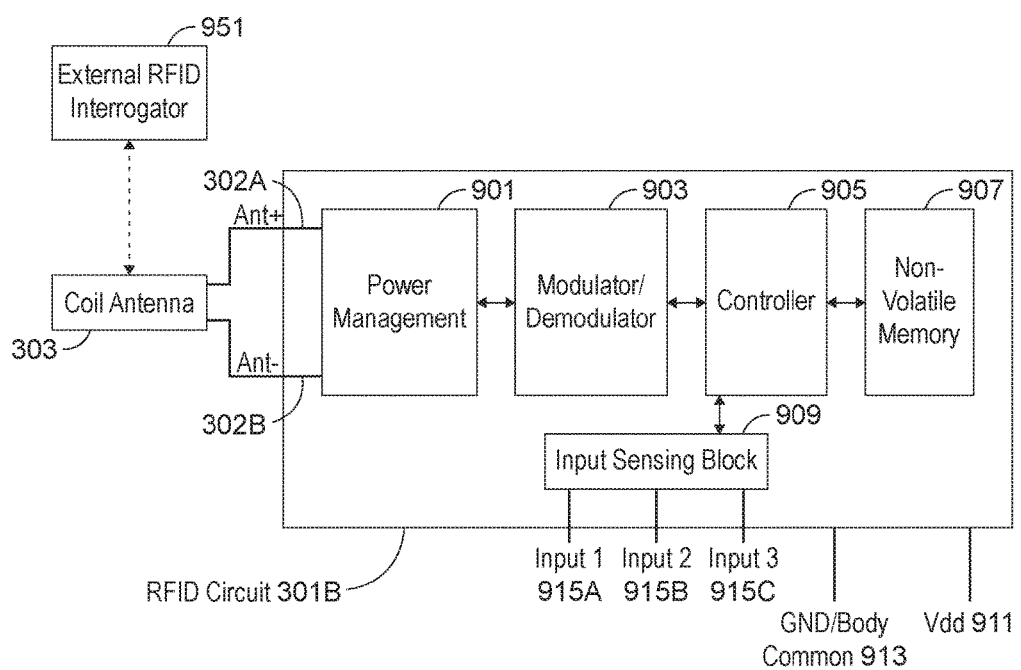
FIG. 11 is a functional block diagram of the NFC/RFID circuit and coil antenna of FIG. 10, which shows the electrically interconnection between these components and the RF interface to an external NFC/RFID interrogator.
Figure 12:
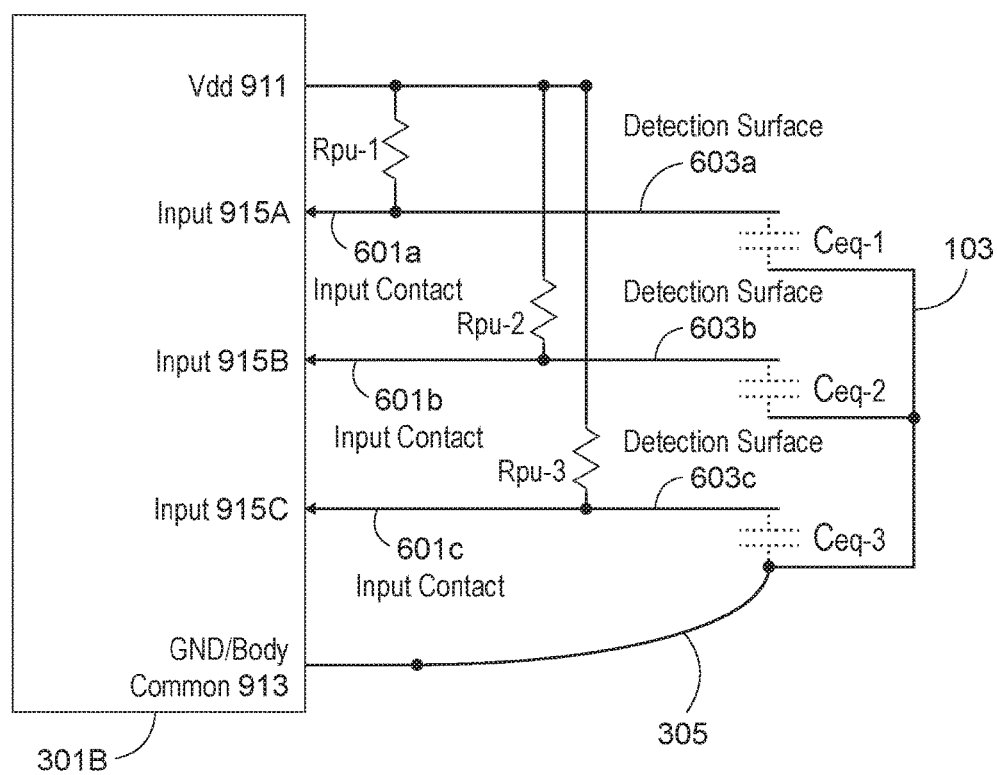
FIG. 12 is a functional block diagram showing electrical interconnection between certain terminals of the NFC/RFID circuit and the multilayer laminate structure of FIG. 10.

FIGS. 10, 11 and 12 illustrate yet another embodiment where the first conductive layer 101A of the multilayer laminated structure is patterned (for example, by etching or printing or stamping) to define local features formed from the first conductive layer 101A, where the local features include a plurality of input contacts (for example three shown as 601A, 601B, 601C) that extend to corresponding detection surfaces (603A, 603B, 603C), two distinct antenna contacts 605 and 607, and a ground or common body contact 609. The input contact 601, the two distinct antenna contacts 605 and 607, and the ground or common body contact 609 are configured to interconnect to corresponding terminals of a suitable NFC/RFID circuit 301B (see FIGS. 11 and 12). The transformative material 107 is encapsulated by the intermediate layers 105A, 105B in the area that underlies the detection surfaces 603A, 603B, 603C. In this configuration, the transformative material 107 can be configured to change impedance between the respective detection surfaces 603A, 603B, 603C and the other conductive layer 103 in response to intrusion through the multilayer laminate structure in the vicinity of the respective detection surfaces 603A, 603B, 603C.

In this embodiment, laminate structure is folded and the coil antenna 903 and NFC/RFID circuit 301B are mounted to folded laminate structure 1000 as shown in FIG. 10. The lateral spacing between the detection surfaces 603A, 603B, 603C can be minimized and/or the area covered by the detection surfaces 603A, 603B, 603C can be configured such that the detection surfaces encompasses a part, all or nearly all of the area of the barrier. Pull-up resistors Rpu-1, Rpu-2, Rpu-3 can be electrically coupled between the Vdd terminal 911 of the NFC/RFID circuit 103B and the corresponding detection surfaces 603A, 603B, 603C as shown in FIG. 12. Note that the areas covered by the detection surfaces 603A, 603B, 603C of FIG. 10 are generally rectangular in shape. However, in other embodiments, the areas covered by the detection surfaces 603A, 603B, 603C can be any other arbitrary sharp, including linear shapes and non-linear shapes.

In this embodiment, the multilayer laminate structure 1000 can function under normal conditions as parallel network of flexible two-plate capacitors with the plurality of detection surfaces 603A, 603B, 603C equivalent to respective plates of the capacitors and the other conductive layer 103 equivalent to an opposed common plate of the capacitors, and the encapsulated transformative material 107 equivalent to the dielectric medium between the two plates of the capacitors. For each two-plate capacitor of the network, the multilayer laminate structure provides a relatively high impedance electrical current path between the respective detection surface (603A, 603B, or 603C) and the other conductive layer 103. In response to intrusion in the vicinity of the respective detection surface (603A, 603B, or 603C), the transformative material can be configured to undergo a state change (for example, by a chemical reaction or physical change) such that the material provides all or part of a relatively low impedance electrical current between the respective detection surface (603A, 603B, or 603C) and the other conductive layer 103.

In response to one or more commands issued by the external NFC/RFID interrogator 951, the input sensing block 909 of the NFC/RFID circuit 301B can be configured to sense and detect the voltage signal at the input terminals 915A, 915B, 915C and generate and store a corresponding digital values (data) representing a detected intrusion event in the vicinity of a respective detection surface when the voltage signal at the corresponding input terminal (915A, 915B, or 915C) is less than the predefined threshold voltage for intrusion. Furthermore, the controller 905 of the NFC/RFID circuit 301B can be further configured to communicate the data representing the detected intrusion event(s) to the external NFC/RFID interrogator 951. The external NFC/RFID interrogator 951 can analyze the data communicated from the NFC/RFID circuit 301B to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the packaging system of FIGS. 10, 11 and 12 (which includes the multilayer laminate structure with NFC/RFID circuit and coil antenna) can be used as a sensing barrier that protects the opening into a rigid closed-wall container (such as glass bottle) that houses at least one article. This is similar to embodiment shown in FIG. 4.

In other embodiments, the packaging system of FIGS. 10, 11 and 12 (which includes multilayer laminate structure with NFC/RFID circuit and coil antenna) can be used as a sensing barrier that defines and protects a sealed envelope or pouch or box. This is similar to embodiment shown in FIG. 5B.

In embodiments, the transformative material 107 of the packaging system of FIGS. 10, 11 and 12 can include a metal ion solution (e.g., silver nitrate gel solution) that is displaced (or flows) or undergoes a galvanic displacement reaction that precipitates solid-phase metal (e.g., silver) in response to intrusion through the multilayer laminate structure, where the displacement or the precipitation of the solid-phase metal or both changes the impedance between the first and second conductive layers to form a relatively low impedance electrical current path between the first and second conductive layers of the multilayer laminate structure.

In other embodiments, the transformative material of the multilayer laminate structure as described herein can be an electrolyte of other metals or alloys that undergo a galvanic displacement reaction to form a solid-phase precipitate that changes the impedance between the opposed conductive layers of the laminate structure. For example, the electrolyte can include cooper, lead, tin, nickel, cadmium or other metals. In this case, the outer conductive layer of the multilayer laminate structure that contributes to the galvanic displacement reaction can be formed from a less noble metal (which has a lower galvanic potential).

Figure 13:
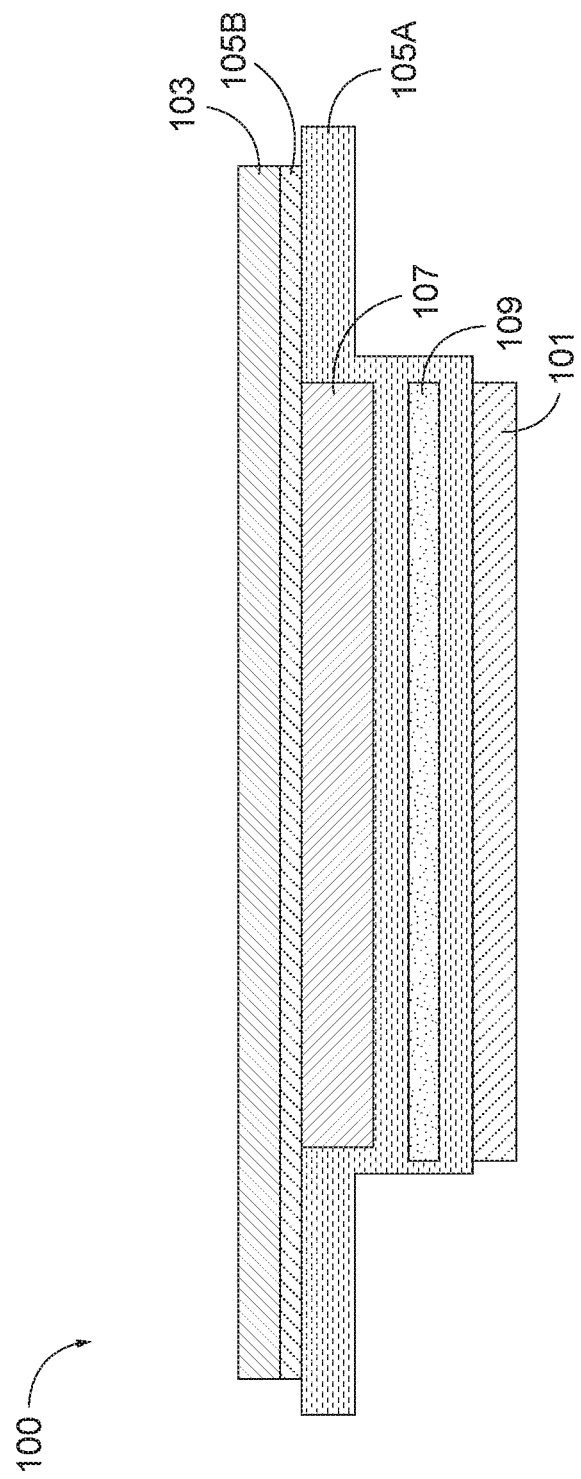
FIG. 13 is a schematic cross-sectional view of another exemplary multilayer laminate structure that can be used in packaging systems according to the present disclosure.

FIG. 13 illustrates yet another embodiment where the multilayer laminate structure 100' includes a chemical reagent 109 that assists or enhances the galvanic displacement reaction or physical change of the transformative material 107 (such as a silver nitride gel solution). In this illustrative embodiment, the chemical reagent 109 is encapsulated by the intermediate layer 105A between the between the first conductive layer 101 and the transformative material 107 (e.g., silver nitrate gel solution). Other configurations can be used to encapsulate the chemical reagent 109 multilayer laminate structure in close proximity to the transformative material 107.

In embodiments, the chemical reagent 109 can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent 109 can be a solution of sodium borohydride and/or glucose that assists or enhances the galvanic displacement reaction of the silver nitride solution that precipitates solid-phase silver. The chemical reagent 109 can possibly include other components such as catalysts, stabilizers, surfactants or initiators, in any combination thereof.

Figure 14A:
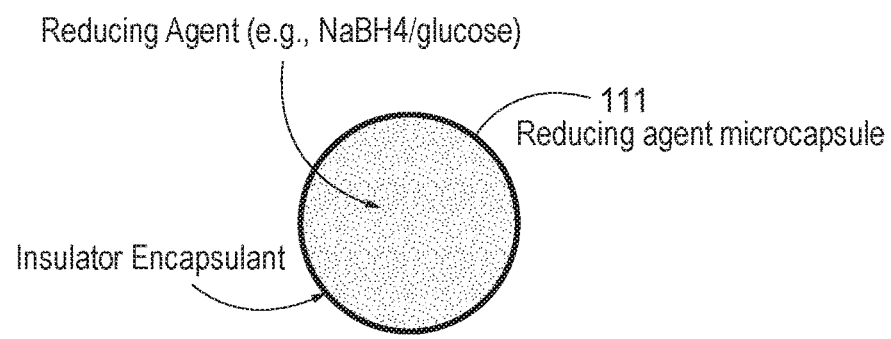
FIG. 14A is a schematic diagram of a microcapsule of chemical reagent.
Figure 14B:
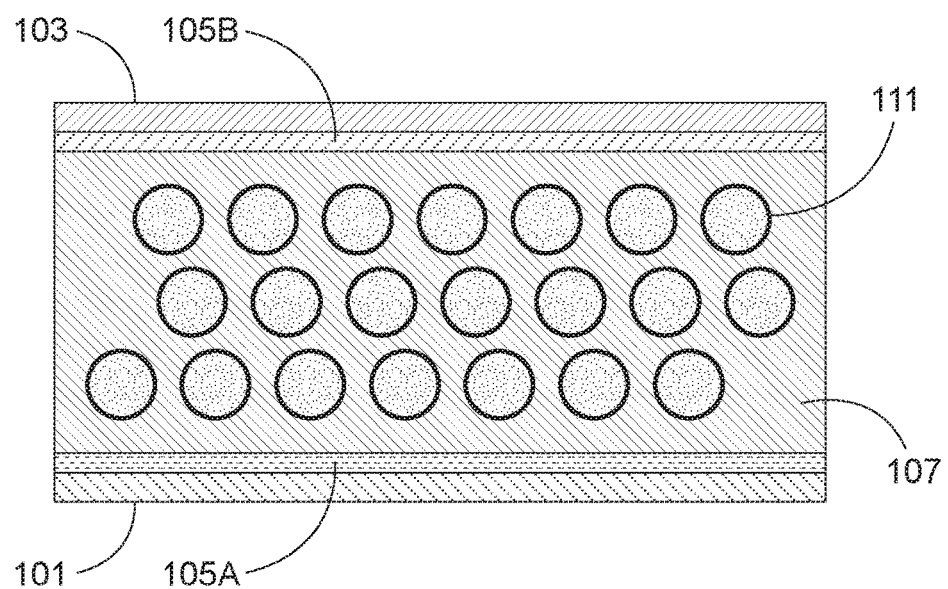
FIG. 14B is a schematic diagram of a multilayer laminate structure where microcapsules of chemical reagent as shown in FIG. 14A are dispersed in a matrix of transformative material (e.g., silver nitrate gel solution).

In another embodiment shown in FIGS. 14A and 14B, the multilayer laminate structure 100 can include microcapsules 111 of a chemical reagent that are dispersed in a matrix of the transformative material 107. The chemical reagent microcapsules 111 can be formed by a thin film insulator encapsulant that surrounds a small volume of the chemical reagent as shown in FIG. 14A. Similar to reagent 109 of FIG. 13, the chemical reagent that fills the microcapsules 111 can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent 109 can be a solution of sodium borohydride and/or glucose that assists or enhances the galvanic displacement reaction of the silver nitride solution that precipitates solid-phase silver. The chemical reagent can possibly include other components such as catalysts, stabilizers, surfactants or initiators, in any combination thereof.

Figure 15A:
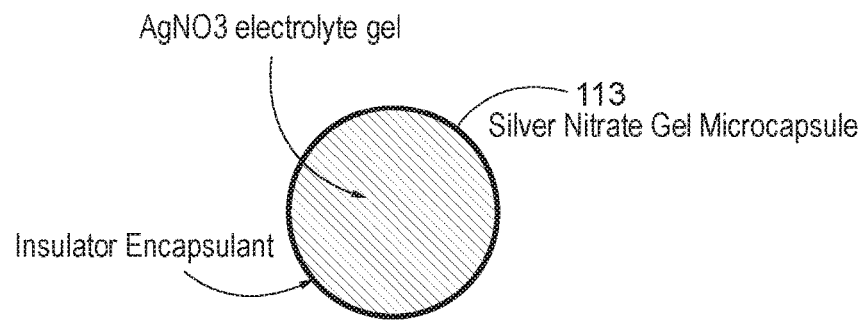
FIG. 15A is a schematic diagram of a microcapsule of transformative material (e.g., silver nitrate gel solution).
Figure 15B:
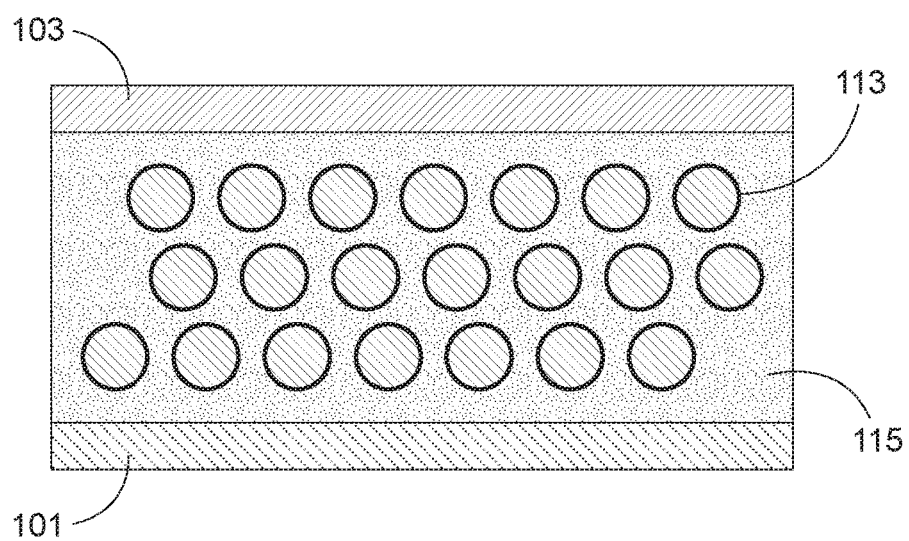
FIG. 15B is a schematic diagram of a multilayer laminate structure where microcapsules of transformative material as shown in FIG. 15A are dispersed in a matrix of chemical reagent.

In another embodiment shown in FIGS. 15A and 15B, the multilayer laminate structure 100 can include microcapsules 111 of the transformative material that are dispersed in a matrix of chemical reagent 115. The transformative material microcapsules 113 can be formed by a thin film insulator encapsulant that surrounds a small volume of the transformative material (e.g., silver nitrate gel solution) as shown in FIG. 15A. Similar to reagent 109 of FIG. 13, the matrix of chemical reagent 115 includes a reducing agent (e.g., sodium borohydride). The transformative material of the microcapsules 111 can be released by the intrusion event and mix with the chemical reagent matrix 115 to assist in the chemical reaction or physical change of the transformative material that results in the formation of the low impedance current path between the first and second conductive layers 101 and 103. The reagent can be configured to react with the transformative material in response to an intrusion event and aids in the transformation of the transformative material. For illustrative purposes, the chemical reagent matrix 115 can be a solution of sodium borohydride and/or glucose that assists or enhances the galvanic displacement reaction of the silver nitride solution that precipitates solid-phase silver. The chemical reagent matrix 115 can possibly include other components such as catalysts, stabilizers, surfactants or initiators, in any combination thereof. Note that in the embodiment of FIG. 15, the intermediate layers 105A and 105B of the laminate structure of FIG. 1 can be omitted.

Figure 16:
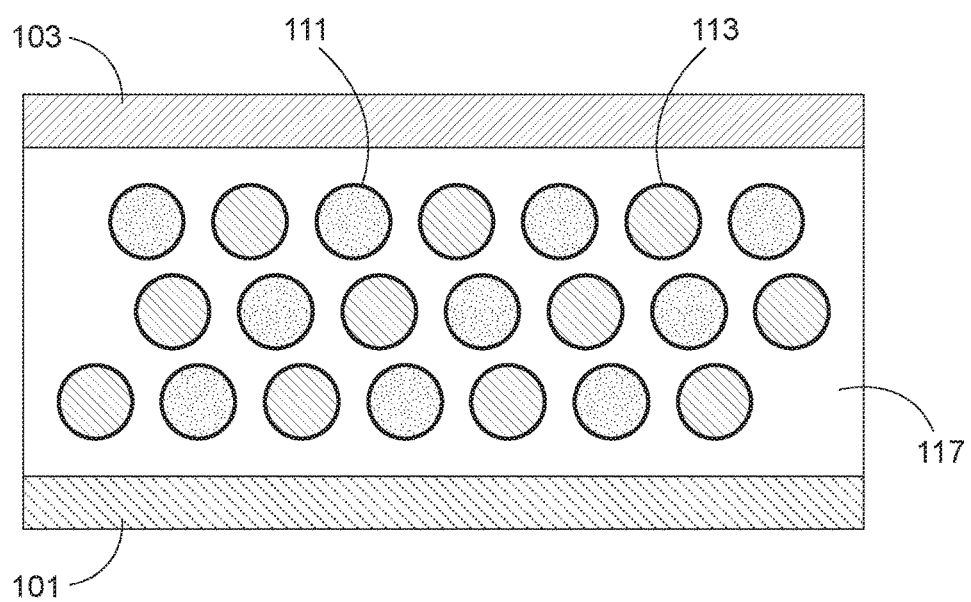
FIG. 16 is a schematic diagram of a multilayer laminate structure where microcapsules of chemical reagent as shown in FIG. 14A and microcapsules of transformative material as shown in FIG. 15A are both dispersed in an inert matrix.

In yet another embodiment shown in FIG. 16, the multilayer laminate structure can include microcapsules 111 of chemical reagent and microcapsules 113 of transformative material that are both dispersed in an inert matrix 117. The chemical reagent microcapsules 111 can be formed by a thin film insulator encapsulant that surrounds a small volume of the chemical reagent as shown in FIG. 14A. The transformative material microcapsules 113 can be formed by a thin film insulator encapsulant that surrounds a small volume of the transformative material (e.g., silver nitrate gel solution) as shown in FIG. 15A. The chemical reagent microcapsules 111 include a chemical reagent (such as a reducing agent of sodium borohydride) similar to reagent 109 of FIG. 13. The reagent of the microcapsules 111 as well as the transformative material of the microcapsules 113 can be released by the intrusion event and mix with one another in the inert matrix 117 to assist in the chemical reaction or physical change of the transformative material that results in the formation of the low impedance current path between the first and second conductive layers 101 and 103. The chemical reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitride solution that precipitates solid-phase silver. The chemical reagent can possibly include other components such as catalysts, stabilizers, surfactants or initiators, in any combination thereof. Note that in the embodiment of FIG. 16, the intermediate layers 105A and 105B of the laminate structure of FIG. 1 can be omitted.

Figure 17:
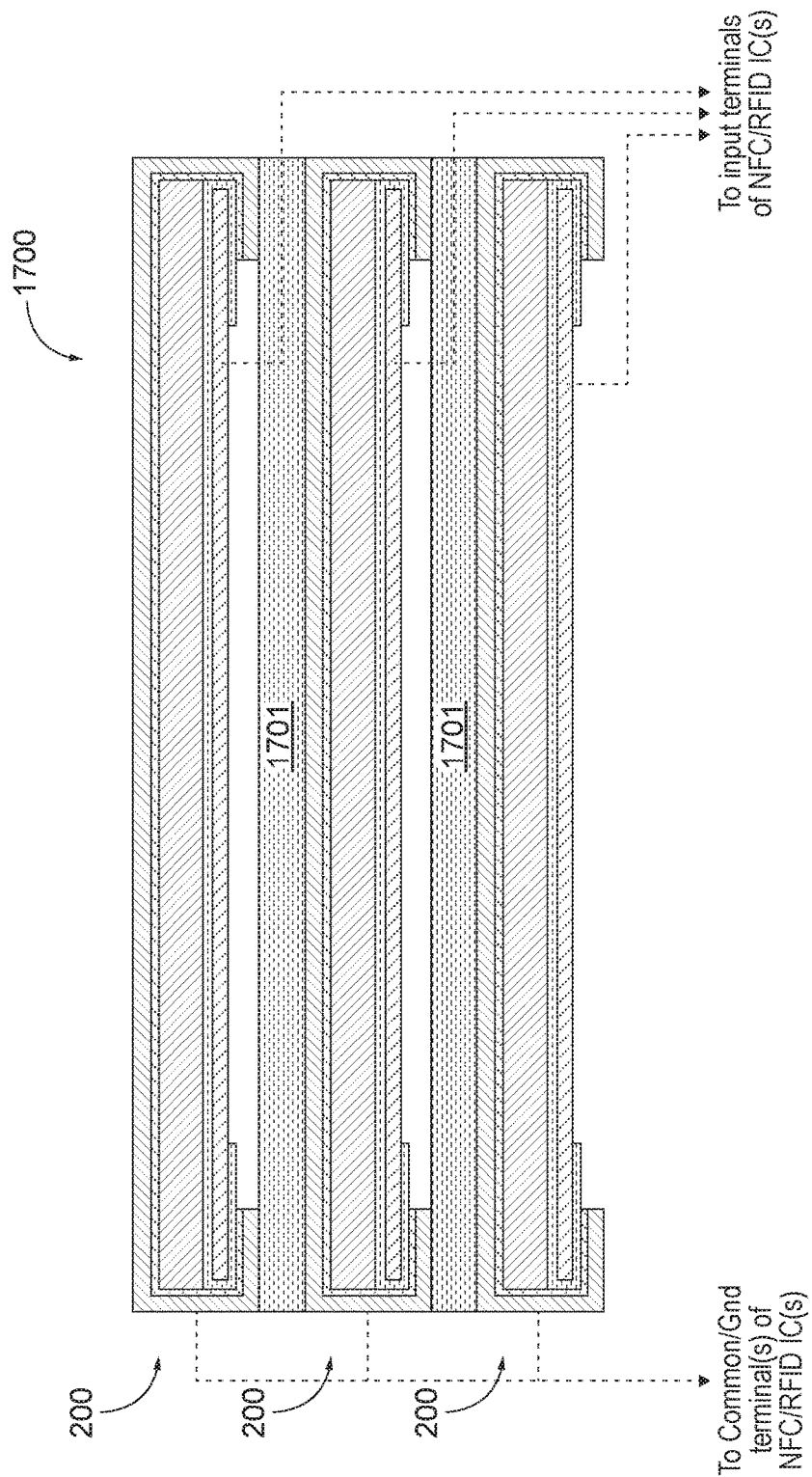
FIG. 17 is a schematic diagram of an arrangement of stacked multilayer laminate structures.

In yet another embodiment shown in FIG. 17, a plurality of multilayer laminate structures (for example, three shown and labeled 200) can be arranged in a stacked configuration (one on top of the other) where each one of the plurality of multilayer laminate structures are electrically coupled as an independent input to one or more NFC/RFID circuits and corresponding antenna coil(s). Each multilayer laminate structure may be electrically coupled to separate tag subassemblies or to a single tab subassembly. Each multilayer laminate structure may be electrically coupled to multiple grounds/commons or to a single ground/common layer connecting each capacitive detecting plane. Sealant layers 1701 can be interposed between the multilayer laminate structures 200 and secure the multilayer laminate structures 200 together to form the stacked configuration. The sealant layers can also provide for electrical isolation between the adjacent multilayer laminate structures 200.

Figure 18:
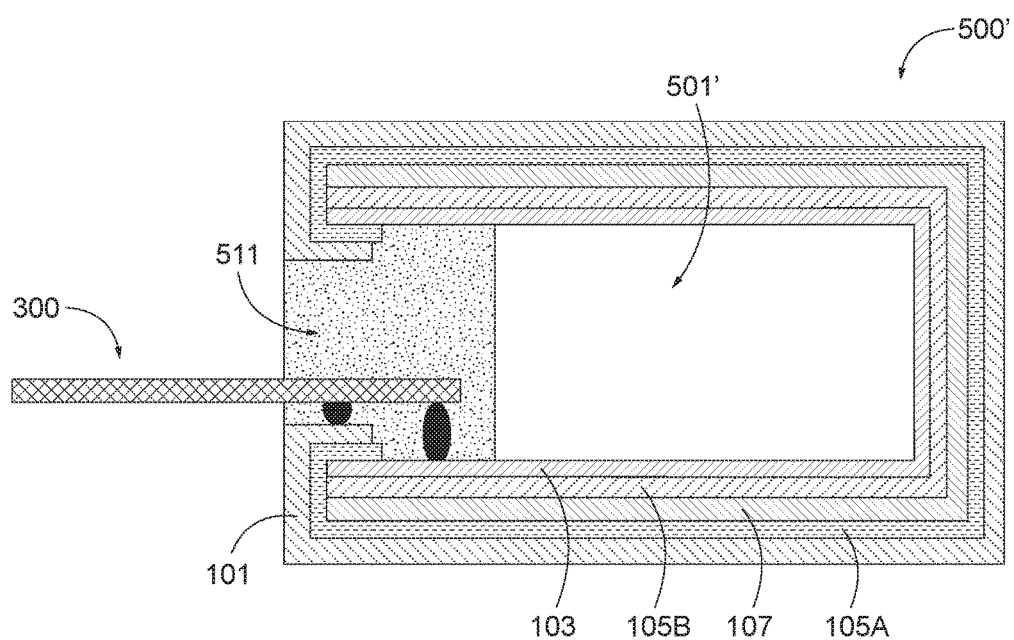
FIG. 18 is a schematic cross-sectional view of an exemplary packaging system that is folded to provide barrier that defines a sealed envelope or pouch or box.

FIG. 18 illustrates an alternate embodiment where the multiplayer laminate structure is folded to define a sealed envelope or pouch or box 500' with a space 501' that houses the at least one article. The folded arrangement has edges sealed by a sealant 511. In embodiments, the sealant 511 can be an epoxy thermoset sealant, which can be cured by UV light, heat or other means. In the folded arrangement, the first conductive layer 101 surrounds the perimeter of resulting structure 500' opposite the second conductive layer 103. An NFC/RFID subassembly 300 as described above is mounted and electrically connected to the first and second conductive layers of the folded multilayer laminate structure in a similar manner as described above with respect to FIGS. 3A and 3B. In this configuration, the multilayer laminate structure provides a protective sensing barrier that can detect intrusion through the protective barrier into the internal space 501' of the envelope or pouch or box 500' with the detection surface 101 on the outside or exterior of the envelope or pouch or box 500'. In this case, the second conductive layer 103 is positioned facing the package product and closest to the packaged product, while the first conductive layer/detection surface 101 is positioned facing away from the package product and furthest from the packaged product. This embodiment is similar to the embodiment of FIGS. 5A and 5B as described above; however, the ordering of the layers of the multilayer laminate structure from the inside to outside is inverted with respect the layer ordering of the embodiment of FIGS. 5A and 5B.

In another aspect, a method is provided to verify and validate package integrity. The method employs a packaging system as described and claimed where at least one operational characteristic of the NFC/RFID circuit is dependent on change in impedance between the first and second conductive layers of the multilayer laminate structure in response to an intrusion event. The method includes employing an NFC/RFID interrogator to ascertain the operational characteristic of the NFC/RFID circuit to detect the intrusion and output an indication (e.g., visual or audible notification) of the intrusion if and when the intrusion is detected. The NFC/RFID circuit and NFC/RFID interrogator can cooperate to read other information that is related to the packaged article(s) and stored by the NFC/RFID circuit, such as a product identifier, manufacturing information (such as Plant Number and Lot number), quality control information, shipping information, consumer information (e.g., patient compliance to a course of treatment) and other arbitrary information.

The packaging system and associated method can be used to verify and validate package integrity and detect package intrusion for a wide range of articles, including but not limited to the following:

medicine (e.g., insulin, vaccines, delicate medicines),
food (e.g., Kosher, Vegan, Halal, non-GMO, wine provenance),
chemicals and radioactive reagents (process integrity),
forensics samples (e.g., collected from the scene of a crime),
electronics (e.g., specialized microchips),
electro-mechanical products (e.g., airplane parts),
branded products (e.g., Gucci, Chanel, Wine, Spirits),
lifestyle personal products (e.g., condoms, sex toys),
documents (e.g., confidential and private documents), and
and combinations of these products or other products thereof The packaging system and method can be used to verify and validate package integrity and detect package intrusion and read other information that is related to the packaged article(s) and stored by the NFC/RFID circuit over time (e.g., polled by one or more external NFC/RFID interrogators over time). Such operations can be useful to verify and validate package integrity and detect package intrusion as the article is exchanged along a supply chain. The supply chain can include manufacturing, shipping (for an origin to destination with intermediate locations therebetween), warehousing and distribution, retail stores or shops, point of sale terminals, and other arbitrary points along the supply chain.

There have been described and illustrated herein several embodiments of a packaging system that can be used to verify and validate package integrity and detect package intrusion. While particular embodiments of the invention have been described, it is not intended that the invention be limited thereto, as it is intended that the invention be as broad in scope as the art will allow and that the specification be read likewise. Thus, while particular combinations of materials have been disclosed, it will be appreciated that other suitable materials can be used as well. Moreover, while particular configurations have been disclosed in reference to the containers and forms of the packaging, it will be appreciated that other configurations could be used as well. It will therefore be appreciated by those skilled in the art that other modifications could be made to the provided invention without deviating from its spirit and scope as claimed.

What is claimed is:

1. A packaging system comprising:
 a sensing barrier protecting at least one article, wherein the barrier comprises a multilayer laminate structure that encapsulates a transformative material between first and second conductive layers, wherein the transformative material is configured to change impedance between the first and second conductive layers in response to intrusion; and
 an NFC/RFID circuit electrically coupled to the first and second conductive layers of the multilayer laminate structure, wherein at least one operational characteristic of the NFC/RFID circuit is dependent on the change in impedance between the first and second conductive layers of the multilayer laminate structure due to intrusion.

2. The packaging system of claim 1, wherein:
 the multilayer laminate structure has a first configuration that provides a relatively high impedance electrical current path between the first and second conductive layers under normal conditions absent intrusion; and
 the multilayer laminate structure has a second configuration that provides a relatively low impedance electrical current path between the first and second conductive layers in response to the intrusion.

3. The packaging system of claim 1, wherein:
 the transformative material undergoes a state change that changes impedance between the first and second conductive layers in response to intrusion.

4. The packaging system of claim 3, wherein:
 the transformative material comprises a reactive material that undergoes a physical change or chemical reaction that irreversibly deposits material that forms to a relatively low impedance electrical current path between the first and second conductive layers in response to intrusion.

5. The packaging system of claim 4, wherein:
 the multilayer laminate structure further includes an encapsulated reagent that reacts with the transformative material to aid the physical change or chemical reaction that irreversibly deposits material that form the relatively low impedance electrical current path between the first and second conductive layers in response to intrusion.

6. The packaging system of claim 5, wherein:
 the multilayer laminate structure includes microcapsules of the transformative material or microcapsules of the reagent or both, where such microcapsules release encapsulated material or reagent for mixing in response to intrusion.

7. The packaging system of claim 3, wherein:
 the transformative material comprises metal ions that undergo a galvanic displacement reaction that precipitates solid-phase metal in response to the intrusion, wherein the solid phase metal forms all or part of a low impedance electrical current path between the first and second conductive layers in response to intrusion.

8. The packaging system of claim 1, further comprising:
 an antenna with two antenna terminals that are electrically coupled to the NFC/RFID circuit.

9. The packaging system of claim 8, wherein:
 the antenna is printed on a flexible substrate that also supports the NFC/RFID circuit.

10. The packaging system of claim 8, wherein:
 the NFC/RFID circuit is a passive NFC/RFID circuit that cooperates with the antenna to receive and store electrical power from electromagnetic radiation emitted by an external NFC/RFID interrogator.

11. The packaging system of claim 10, wherein:
 the first and second conductive layers of the multilayer laminate structure are electrically coupled to the two antenna terminals; and
 the transformative material is configured to provide all or part of a relatively low impedance electrical current path between the first and second conductive layers and the two antenna terminals electrically coupled thereto in response to intrusion.

12. The packaging system of claim 11, wherein:
 the relatively low impedance electrical current path between the two antenna terminals as provided by the transformative material in response to intrusion automatically configures the passive NFC/RFID circuit to remain in a power-off state in the presence of electromagnetic radiation that is normally sufficient to provide electrical power to the passive NFC/RFID circuit.

13. The packaging system of claim 1, wherein:
 one of the first and second conductive layers is configured to define a detection surface;
 the transformative material is configured to change impedance between the detection surface and the other conductive layer in response to intrusion;
 the detection surface is electrically coupled to a corresponding input terminal of the NFC/RFID circuit.

14. The packaging system of claim 13, wherein:
 the NFC/RFID circuit has a configuration that detects a signal at the input terminal that results from the change of impedance between the detection surface and the other conductive layer due to intrusion.

15. The packaging system of claim 14, wherein:
 the NFC/RFID circuit is further configured to derive data from such signal and communicate the data to an external NFC/RFID interrogator.

16. The packaging system of claim 14, wherein:
 a resistor is electrically coupled between a positive voltage supply terminal of the NFC/RFID circuit and the detection surface; and
 the other conductive layer is electrically connected to a ground or common body terminal of the NFC/RFID circuit.

17. The packaging system of claim 13, wherein:
 the detection surface encompasses a part, all or nearly all of the area of the sensing barrier.

18. The packaging system of claim 13, wherein:
 the multilayer laminate structure has a first configuration that provides a relatively high impedance electrical current path between the detection surface and the other conductive layer under normal conditions absent intrusion; and
 the multilayer laminate structure has a second configuration where the transformative material provides all or part of a relatively low impedance electrical current path between the detection surface and the other conductive layer in response to intrusion.

19. The packaging system of claim 1, wherein:
 one of the first and second conductive layers is configured to define a plurality of detection surfaces;
 the transformative material is configured to change conductivity between at least one detection surface and the other conductive layer in response to intrusion;

the plurality of detection surfaces are electrically coupled to corresponding input terminals of the NFC/RFID circuit.

20. The packaging system of claim 19, wherein:
the NFC/RFID circuit has a configuration that detects a signal at one or more input terminals that results from the change of impedance between a respective detection surface and the other conductive layer due to intrusion.

21. The packaging system of claim 20, wherein:
the NFC/RFID circuit is further configured to derive data from such signal and communicate the data to an external NFC/RFID interrogator.

22. The packaging system of claim 20, wherein:
a plurality of resistors are electrically coupled between a positive voltage supply terminal of the NFC/RFID circuit and corresponding detection surfaces; and
the other conductive layer is electrically connected to a ground or common body terminal of the NFC/RFID circuit.

23. The packaging system of claim 1, wherein:
the sensing barrier covers an opening into a container that houses the at least one article.

24. The packaging system of claim 1, wherein:
the sensing barrier defines a space that houses the at least one article.

25. The packaging system of claim 1, wherein:
the sensing barrier comprises the multilayer laminate structure in a folded arrangement that defines a space that houses the at least one article.

26. The packaging system of claim 1, wherein:
the operational characteristic of the NFC/RFID circuit is tested to detect the intrusion.

27. The package system of claim 1, wherein:
the at least one article is selected from the group consisting of medicine (e.g., insulin, vaccines, delicate medicines), food (e.g., Kosher, Vegan, Halal, non-GMO, wine provenance), chemicals and radioactive reagents (process integrity), forensics samples (e.g., collected from the scene of a crime), electronics (e.g., specialized microchips), electro-mechanical products (e.g., airplane parts), branded products (e.g., Gucci, Chanel, Wine, Spirits), lifestyle personal products (e.g., condoms, sex toys), documents (e.g., confidential and private documents), and combinations of these products or other products thereof.

28. A method of verifying and validating package integrity, comprising:
i) providing a packaging system of claim 1; and
ii) employing an NFC/RFID interrogator to ascertain the operational characteristic of the NFC/RFID circuit of the packaging system to detect intrusion and output an indication of the intrusion if and when the intrusion is detected.

29. A method according to claim 28, further comprising:
iii) repeating the operations of ii) at multiple points in time to detect intrusion and output an indication of the intrusion if and when the intrusion is detected.

30. A method of verifying and validating package integrity, comprising:
i) providing a packaging system of claim 1 as the article is exchanged along a supply chain; and
ii) at one or more points along the supply chain, employing an NFC/RFID interrogator to ascertain the operational characteristic of the NFC/RFID circuit of the packaging system to detect intrusion and output an indication of the intrusion if and when the intrusion is detected.

* * * * *

UNITED STATES PATENT AND TRADEMARK OFFICE
CERTIFICATE OF CORRECTION

| | |
|---|---|
| PATENT NO. | : 10,332,373 B1 |
| APPLICATION NO. | : 16/180512 |
| DATED | : June 25, 2019 |
| INVENTOR(S) | : Rohinton S. Dehmubed and Peter Gompper |

Page 1 of 1

It is certified that error appears in the above-identified patent and that said Letters Patent is hereby corrected as shown below:

In the Specification

Column 14:
Line 27, change "silver nitrite" to --silver nitrate--
Line 30, change "silver nitrite" to --silver nitrate--
Line 34, change "silver nitrite" to --silver nitrate--
Lines 38-39, change "silver nitrite" to --silver nitrate--
Line 41, change "silver nitrite" to --silver nitrate--
Line 48, change "silver nitrite" to --silver nitrate--
Line 52, change "silver nitrite" to --silver nitrate--

Signed and Sealed this
Fifteenth Day of December, 2020

Andrei Iancu
*Director of the United States Patent and Trademark Office*